(12) United States Patent
Barwick et al.

(10) Patent No.: US 8,494,703 B2
(45) Date of Patent: Jul. 23, 2013

(54) VARIABLE OFFSET POSITIONING ANTENNA ARRAY FOR ENHANCED GUIDANCE OF AUTOMATED GUIDED VEHICLES (AGVS)

(75) Inventors: Stott Barwick, Smithfield, UT (US); Merin Swasey, North Logan, UT (US); Lance Beeny, Cove, UT (US); John A. M. Petersen, Providence, UT (US)

(73) Assignee: Boomerang Systems, Inc., Morristown, NJ (US)

( * ) Notice: Subject to any disclaimer, the term of this patent is extended or adjusted under 35 U.S.C. 154(b) by 734 days.

(21) Appl. No.: 12/688,838

(22) Filed: Jan. 15, 2010

(65) Prior Publication Data

US 2010/0185353 A1    Jul. 22, 2010

Related U.S. Application Data

(60) Provisional application No. 61/258,006, filed on Nov. 4, 2009, provisional application No. 61/248,448, filed on Oct. 3, 2009, provisional application No. 61/145,543, filed on Jan. 17, 2009.

(51) Int. Cl.
    *G01C 22/00* (2006.01)
(52) U.S. Cl.
    USPC .......................................................... 701/23
(58) Field of Classification Search
    USPC .................................... 701/23, 36, 41, 50, 61
    See application file for complete search history.

(56) References Cited

U.S. PATENT DOCUMENTS

| 4,973,219 | A | 11/1990 | Brickner et al. |
| 5,111,401 | A | 5/1992 | Everett, Jr. et al. |
| 5,650,703 | A | 7/1997 | Yardley et al. |
| 5,906,647 | A * | 5/1999 | Zyburt et al. ................... 701/24 |
| 2006/0290472 | A1 * | 12/2006 | Onderko et al. ............. 340/10.1 |
| 2007/0065258 | A1 | 3/2007 | Benedict et al. |
| 2007/0156320 | A1 | 7/2007 | Breed et al. |

FOREIGN PATENT DOCUMENTS

| EP | 1 925 762 | 5/2008 |
| JP | 2002-274250 | 9/2002 |

(Continued)

OTHER PUBLICATIONS

International Search Report with Written Opinion for related International Application No. PCT/US2010/021283, mail date Aug. 17, 2010.
International Search Report with Written Opinion for corresponding International Application no. PCT/US2010/021285, mail date Sep. 2, 2010.

*Primary Examiner* — Kim T Nguyen
(74) *Attorney, Agent, or Firm* — Graham Curtin, P.A.

(57) ABSTRACT

A Variable Offset Positioning Antenna Array for Enhanced Guidance of Automated Guided Vehicles (AGVs) in automated warehousing or storage systems for automobiles or the like, includes two or more inductor coils producing output as a result of interaction with a guidance wire located in or near the surface of the floor which is energized by a frequency generator, and an on board programmable microprocessor which processes the coil output to determine an exact position of the antenna array relative to the guidance wire. In one embodiment, the antenna array enables an AGV to follow a guidance wire at an offset to the direction of travel in order to allow automated storage and retrieval systems to handle asymmetrical items, such as automobiles, more efficiently and cost effectively by decreasing the building space required for travel aisles, vertical conveyors and storage locations as well as decreasing total individual item processing time.

11 Claims, 28 Drawing Sheets

FOREIGN PATENT DOCUMENTS

| | | |
|---|---|---|
| JP | 2003-321102 | 11/2003 |
| JP | 2005-138883 | 6/2005 |
| JP | 2005-280963 | 10/2005 |
| JP | 2008-546613 | 12/2008 |

* cited by examiner

FIG. 5A
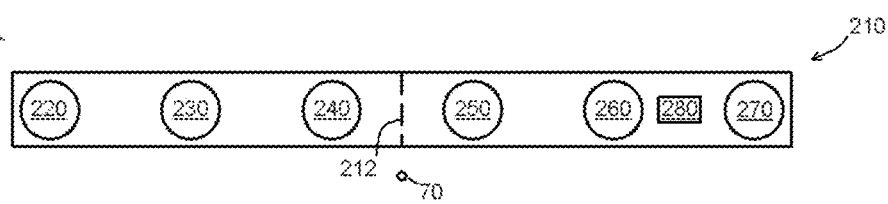
FIG. 5B
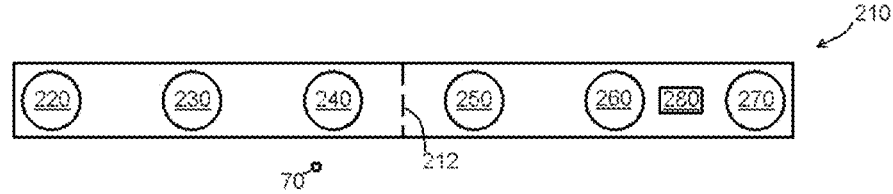
FIG. 5C
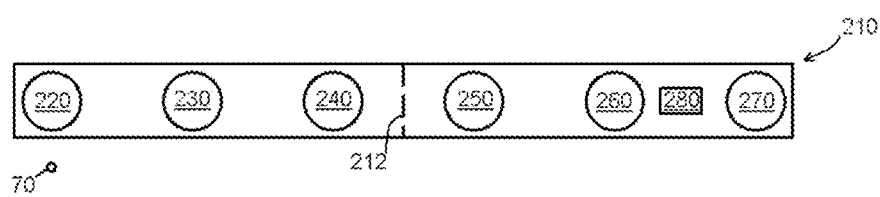
FIG. 5

VARIABLE OFFSET POSITIONING ANTENNA ARRAY FOR ENHANCED GUIDANCE OF AUTOMATED GUIDED VEHICLES (AGVS)

CROSS-REFERENCE TO RELATED APPLICATIONS

This application claims the benefit of U.S. Application 61/145,543, filed Jan. 17, 2009, U.S. Application 61/248,448, filed Oct. 3, 2009, and U.S. Application 61/258,006, filed Nov. 4, 2009, the contents of each of which are incorporated herein by reference.

FIELD OF THE INVENTION

The present invention relates to the guidance and control of an automated guided vehicle (hereinafter AGV) generally, and more particularly, in one embodiment, to a system that enables an AGV to transport both regularly and irregularly shaped loads between a storage location and an access location by assuming an offset position relative to a guidance system such as, for example, an in-ground guidance wire.

BACKGROUND

Conventional parking garages are transforming the landscape to meet the demand for high capacity storage. In urban centers, where space above and below ground is at a premium, the owner of a parking facility is constrained by a fixed footprint and a certain amount of vertical space extending from such footprint. Multi-level garages can only extend so high without becoming an eyesore or unwieldy to navigate. Furthermore, self-park and/or attendant-park locations must account for extra space on either side of a vehicle for human access to and around the vehicles.

In addition, each storage location has an associated amount of overhead that must be accommodated by the facility owner. For example, most facilities usually allow more than adequate space in front of each storage location to allow for typical ingress and egress. Also provided are typical human amenities such as hallways, stairways, elevators, fire escapes, appropriate lighting, and possibly vending machines, bathrooms, office space for onsite personnel, security gates, cameras, alarm systems, and the like. Self park facilities also frequently promote accidental contact between cars due to driver error, and create opportunities for thieves, vandals and other undesirables. Accordingly, for each storage location at a given site, there is an associated amount of extra space necessary to accommodate user access and traffic, as well as an associated amount of additional resources for human amenities, security and the like.

The required level of overhead limits the number of vehicles that can be stored at a site and adds considerably to the cost of operating a parking facility. There is a need, therefore, for an automated storage system that overcomes the need for human-related overhead, that is efficient to construct and operate, and that does not require additional space or property necessary to accommodate sporadic human access.

Existing and established methods of maneuvering an AGV along an in-floor guidance wire use either a single antenna precisely centered on the front of the AGV, or a pair of antennas precisely centered on the front and rear of the AGV relative to the direction of travel. Conventional AGV guidance systems use only the antenna currently leading the AGV, or the "front" antenna based upon the AGV's direction of travel, to follow the in-floor guidance wire. The trailing or "rear" antenna on an AGV equipped with two antennas is inactive until the AGV reverses direction, at which point the rear antenna effectively becomes the "front" antenna and takes over the AGV system guidance responsibilities. The in-floor guidance wire is laid out in a loop connected to, and energized by, a frequency generator, which transmits an alternating current frequency through the guidance wire. Each guidance antenna for the AGV contains two inductor coils, which individually generate an output voltage based upon the coil's proximity to the magnetic field generated by the frequency carrying guidance wire. By balancing the relative strength of the signal output from each of the two inductor coils on the front antenna, and subtracting the strength of the output from one coil from the strength of the output from the other coil, and then adjusting the steering of the AGV to target the point where the "subtractive output" from both coils is equal to zero, the control system of the AGV dynamically adjusts the steering of the AGV to keep the center of the antenna, and therefore the center line of the AGV relative to the direction of travel, approximately centered over the in-floor guidance wire. Often these systems deploy guidance wires in a grid fashion, with one set of wires effectively forming an "X axis" and another forming a "Y axis" to allow AGVs to maneuver in two directions along the wire grid by turning to follow different axis wires and travelling in different directions along the different grid axes. At other times these conventional systems use a gradually curving wire with a fairly large turn radius to allow the AGV to follow a single wire to travel in an alternate direction.

There are three common problems/limitations of existing AGV guidance systems:

1) When the AGV travels to a position where either outer edge of an antenna inductor coil suddenly passes beyond the vertical plane of the in-floor guidance wire, the antenna produces a signal which is the same regardless of which side of the wire the antenna is on. Because the system is unable to positively identify which direction of travel is required to re-acquire the guidance wire, an "off wire" alarm condition usually occurs that stops the AGV and requires human intervention to return the AGV to the guidance wire and reactivate it. Alternately, the AGV can follow a limited search pattern to find the guidance wire, but with the risk of searching too far in the wrong direction and becoming further lost and/or risking a possible collision with objects outside the normal AGV travel lane.
2) The "centered only" travel path greatly limits the ability of AGV systems to efficiently process and transport asymmetrically proportioned items, and with the result that AGV systems are primarily implemented to handle items which have very limited, or at least very predictable, variations in size and shape.
3) The "subtractive output" analysis of the coil signal has some weakness and reliability issues which can cause guidance system problems if there are variations throughout the course of travel in the distance between the antennas and guidance wire or other items which impact the relative strength of the magnetic field generated by the guidance wire signal.

SUMMARY

One embodiment of the present invention uses substantially similar in-floor guidance wire systems with significantly different antennas and inductor coil configurations, and processes the output from the inductor coils through an onboard programmable microprocessor which analyzes the relative strength of signal output of one or more inductor coils as a ratio of the total strength of signal output currently detected by all coils, or a selection of other adjacent coils, to determine the precise position of the antenna, and therefore the AGV, relative to the guidance wire, rather than merely targeting a "subtractive output" value approaching zero.

The present system employs significant advances in guidance control methodology that more efficiently uses an in floor wire based guidance system. Instead of a dynamic steering system that always attempts to guide the AGV to a position where the output from two coils is approximately balanced, resulting in the AGV always being approximately centered relative to its direction of travel over the guidance wire, the guidance system of the invention can purposefully shift the AGV to track at a specific and dynamically variable offset distance relative to the guidance wire by following the wire at any point within the outer cumulative boundary of an array of two or more inductor coils. This is accomplished by directing the AGV to follow a specific output reading, which equals a numeric expression of an exact position relative to the in-floor guidance wire, based upon an analysis of the relative strengths of the output from two or more inductor coils. This allows the AGV to deliberately follow an "offset track" in which the center line of the AGV in respect to direction of travel varies as needed and specified relative to the position in the floor of the guidance wire.

An advantage of this "offset track" system is that it enables an AGV to transport asymmetrically shaped items, such as automobiles, which may have a different front overhang (center of front wheel to farthest front extension of the automobile) versus rear overhang (center of rear wheel to farthest rear extension of the automobile) sideways down a transport aisle without significantly expanding the transport aisle's total width relative to the total overall length of the automobile being carried. By shifting the AGV to one side or the other of the guidance wire to compensate for the asymmetrical aspect of the load being carried, the AGV can travel down an aisle approximately the same size as the maximum width of the load while still following a single stationary guidance wire permanently located in the middle of the transport aisle.

Furthermore, the guidance technology of the present invention incorporates more than two inductor coils into a single antenna, forming in those instances an extended antenna array. In this configuration the programmable microprocessor assigns a distinct relative value to each point along the extended antenna array. The AGV guidance system can then be directed to follow the guidance wire at any specific point along the entire length of the array, increasing the amount and specificity of obtainable offset relative to the in-floor guidance wire and/or the center line relative to the direction of travel of the AGV, from several inches, to several feet or more up to the entire length of the antenna array as needed. This allows the total building footprint required for travel lanes and/or storage locations within a structure designed for the storage, transport and retrieval of items which may have an asymmetrical aspect to be significantly decreased at considerable savings in construction, maintenance and real estate related costs.

The manner in which the microprocessor analyzes the output signal from the array of inductor coils enables an AGV guidance control system to affirmatively know which side of the in-floor guidance wire it has passed in the event that an AGV antenna should move so far to one side that the outer most coil extends beyond the in-floor guidance wire. An AGV so equipped can correct its course back toward the in-floor guidance wire until the antenna again detects its presence without the need to immediately experience an off-wire shut down and human intervention.

The use of onboard programmable microprocessor ratio analysis also allows the AGV guidance system to better compensate for variations in wire depth or signal strength without the need for precision of guidance wire installation or the guidance problems which can occur in conventional wire guidance systems.

The onboard programmable microprocessor combined with other AGV steering and guidance control system innovations incorporated in aspects of the present invention enable the front and rear antennas of an AGV equipped with two antennas per direction of travel, to be used simultaneously for steering and control. Such a two antenna guidance system gathers and processes information from both the front and rear antenna on a single AGV to provide a more accurate steering and tracking system and to enable an AGV to perform more complex and exact maneuvers in applications requiring very exact steering. This ability can also be used to provide a steering and control system with increased amounts of feedback from the additional active antenna sensor to verify correct handling, steering, tracking, and drive performance is being realized by the AGV so equipped.

The expanded sensing range and precision with which location relative to a guidance wire can be determined by the antenna array, in accordance with aspects of the present invention, enables another previously unavailable method of following a grid of guidance wires. This is facilitated by mounting four or more antenna arrays on each AGV, for instance one on each side of a roughly rectangular AGV (here referred to as front, back, left side and right side, though an AGV may not actually be limited to assignment of only those four specific directions). While actively travelling in either direction along one guidance wire (called an "X axis" wire in this example), either the front antenna array or both antenna arrays (i.e. the front and rear arrays) will be following the guidance wire at any offset amount which may be specified. The other one or two antenna arrays (in this example referred to as left and right) can simultaneously detect any "Y axis" wires as they are crossed to determine current approximate position of an AGV relative to its direction of travel. In certain situations the relative position and change in relative position of these cross wires as compared to the moving AGV could be used to calculate or confirm in comparison to other system indicators the position, heading, and speed of travel of an AGV. When an AGV approaches a "Y axis" wire that is to be followed, the two "side antennas" will detect the presence of that wire as soon as it enters into the sensing range of the side antenna arrays. Using the output of the microprocessor aboard the antenna arrays, the AGV is directed to slow and stop relative to a newly acquired "Y axis" guidance wire at the exact location, including offset if any as required, and then safely follow the "Y axis" wire based upon the potential asymmetry of its load. At this point all four antenna arrays are positively sensing an exact location relative to both the "X" and "Y" axes ensuring the AGV and load are properly positioned. An AGV with multidirectional travel capability then immediately begins to proceed down the "Y" axis, without having to execute a turning maneuver, with the previous front and rear antennas effectively becoming side antennas sensing crossing grid wires, and the previous side antennas becoming front and rear guidance antennas. This enables a potential decrease in total transit and load processing time and improved system efficiency because the direction of an AGV can be changed without having to allow for a wider turn radius at corners or provide for additional space in travel aisles to accommodate asymmetrical loads. This capability also decreases costs associated with storage system footprint, construction and maintenance.

The greater precision and flexibility of the invention's microprocessor equipped antenna array, combined with the enhanced control system of the invention, the ability to coordinate or confirm positioning through the simultaneous use of multiple antennas, and methodology for enabling an AGV to transport a load with asymmetrical physical characteristics will allow previously impossible transport and storage operations to occur in a very efficient manner. For example, an asymmetrical load, in this case an automobile, which is driven forward into a system loading area, can be acquired by an AGV and brought into the system, then transported sideways or perpendicular to the direction of travel down a travel lane at an offset, and then turned 180 degrees so that upon retrieval it can later be driven forward out of the system. Upon departure, and due to the previously described 180 degree turn, the AGV will travel at an opposite offset relative to the retrieval lane. This adjustment can occur automatically, and the "new" offset orientation can be used by the AGV to transfer the load down other travel lanes, on to and off of vertical conveyors, and into storage spaces or loading areas as needed to complete the desired storage and retrieval operations.

Thus there is provided an automated storage system for vehicles or the like that is provided with a guidance system that interacts with a remote-controlled transport system that transports a vehicle between an access location, such as a drive-up location, and a storage location. More particularly, in one embodiment, omni-directional, battery-powered, wirelessly-controlled AGVs are provided with a positioning and guidance system that allows their travel paths to be shifted relative to an in-floor guidance wire by incorporating antenna arrays composed of two or more inductor coils and a programmable microprocessor which assigns a distinct value to each position within the length of the array, and a control system methodology that the AGV uses to offset its guidance path relative to the in-floor guidance wire. Also provided is an AGV guidance control system which affirmatively knows which side of the antenna has passed beyond an in-floor guidance wire in the event that an "off-wire" condition occurs that could enable an AGV to reliably correct back to a position over the in-floor guidance wire without a guidance system shut down and human intervention. Aspects of the present guidance system are better able to compensate for variations in wire depth or signal strength than conventional wire guidance systems and provide an AGV possessing multidirectional travel capability with a more efficient mode of maneuvering, which can increase system efficiency and decrease costs associated with storage system footprint, construction and maintenance.

BRIEF DESCRIPTION OF THE DRAWINGS

FIG. 5 (FIGS. 5A-5C) illustrates one embodiment of a multiple coil antenna with a programmable onboard microprocessor in various centered and offset positions relative to the in-floor guidance wire.

DESCRIPTION OF PREFERRED EMBODIMENTS

Figure 1:
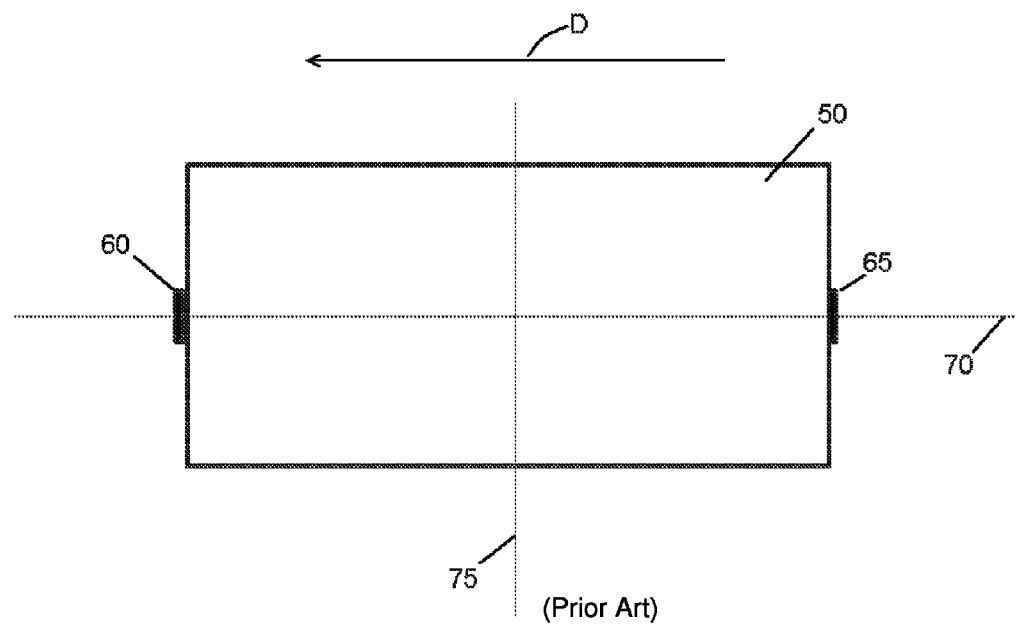
FIG. 1 illustrates a conventional two-antenna AGV oriented to an in-floor guidance wire.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 is a diagrammatic view of one example of a conventional AGV 50 centered over an in-floor guide wire system having an "X"-axis guide wire 70 and a "Y"-axis guide wire 75. Conventional AGV systems are often deployed in a grid of X-axis and Y-axis wires to allow AGVs to perform two-dimensional travel maneuvers along the grid by turning to follow different axis wires and travelling in different directions along the different grid axes. At other times these systems use a gradually curving wire with a fairly large turn radius to allow the AGV to follow a single wire to travel in an alternate direction (see FIG. 12 for example). As discussed herein, the X and Y directions are generally orthogonal and understood with reference to a plan or top view, i.e. looking down on the AGV where the X direction designates horizontal movement and the Y direction designates vertical movement along a floor layout, although it is also understood that the X and Y directions are relative and are designated herein for purposes of convenience and for ease in understanding the relative positioning of the AGV and its environment.

In the embodiment of FIG. 1, the conventional AGV 50 has a front antenna 60 and a rear antenna 65 and is centered over guidance wires 70 and 75. Existing and established methods of maneuvering an AGV along an in-floor guidance wire utilize either a single antenna precisely centered on the front of the AGV (antenna 60 in FIG. 1), or a pair of antennas (antennas 60 and 65 in FIG. 1) precisely centered on the front and rear of the AGV (50 in FIG. 1) relative to the direction of travel D as shown in FIG. 1. Conventional AGV guidance systems use only the antenna currently leading the AGV, or the front antenna based upon the AGV's current direction of travel, to follow the in-floor guidance wire. The trailing or rear antenna is generally inactive until the AGV reverses direction, at which point it becomes the front antenna and takes over the AGV system guidance responsibilities.

Figure 2A:
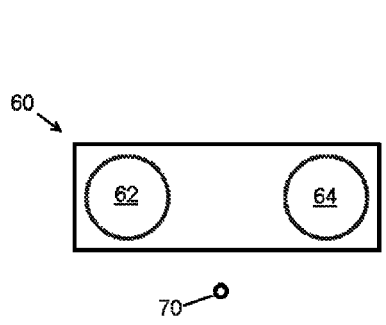
FIG. 2A is an elevational view and FIG. 2B is a plan view of the AGV antenna of FIG. 1.
Figure 2B:
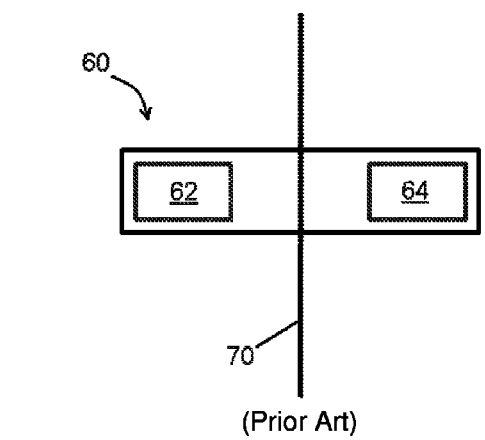

FIG. 2A is an elevation and FIG. 2B is a plan view of the front antenna 60 of FIG. 1. The antenna 60 contains two inductor coils 62 and 64, which individually generate an output voltage based upon their proximity to the magnetic field of the frequency carrying guide wire 70. The in-floor guidance wire (70, 75) is generally laid out in a loop (see loops 920 and 930 in FIG. 14A for example) connected to, and energized by, a frequency generator (see frequency generators 925 and 935 in FIG. 14A for example), which transmits an alternating current frequency through the guide wire. By balancing the relative strength of the signal output from each of these two inductor coils 62, 64 on the antenna 70, and subtracting the strength of the output from one coil from the strength of the output from the other coil, and then adjusting the steering of the AGV 50 to target the point where the subtractive output from both coils is equal to zero, the control system (not shown) of the AGV 50 dynamically adjusts the steering of the AGV 50 to keep the center of the antenna 60, and therefore the center line of the AGV 50 relative to the direction of travel, approximately centered over the in-floor guidance wire 70.

However, as noted previously, conventional AGV systems have many drawbacks that limit the ability of the AGV to react to unexpected travel conditions, such as blockages in a travel lane, or to perform operations that require the AGV to position in an offset condition relative to a guidance wire system. The two antennas, two coil system described in FIGS. 1-2B limits a conventional AGV's travel to a centered position relative to a guidance system, which results in an inefficient system as compared with the AGV array and control method of the present invention.

Figure 3:
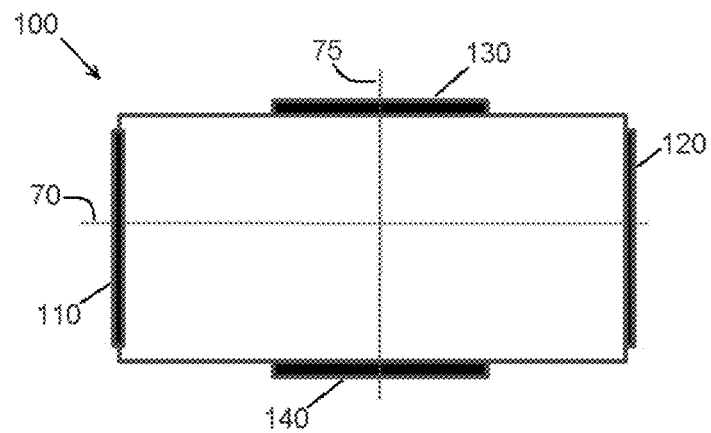
FIG. 3 is one embodiment of an enhanced AGV including a plurality of variable offset positioning antenna arrays of the present invention.
Figure 14A:
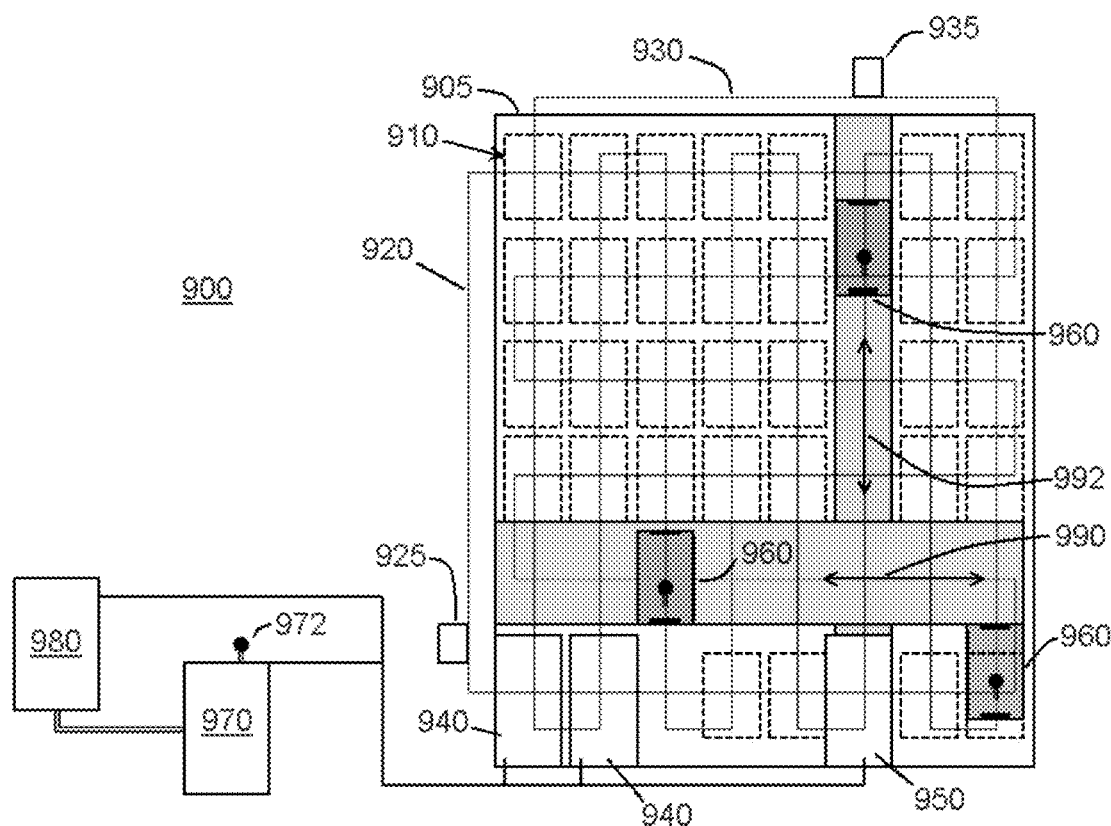
FIG. 14A is a schematic view of one embodiment of a control system for a facility utilizing the enhanced AGV of the present invention.
Figure 14B:
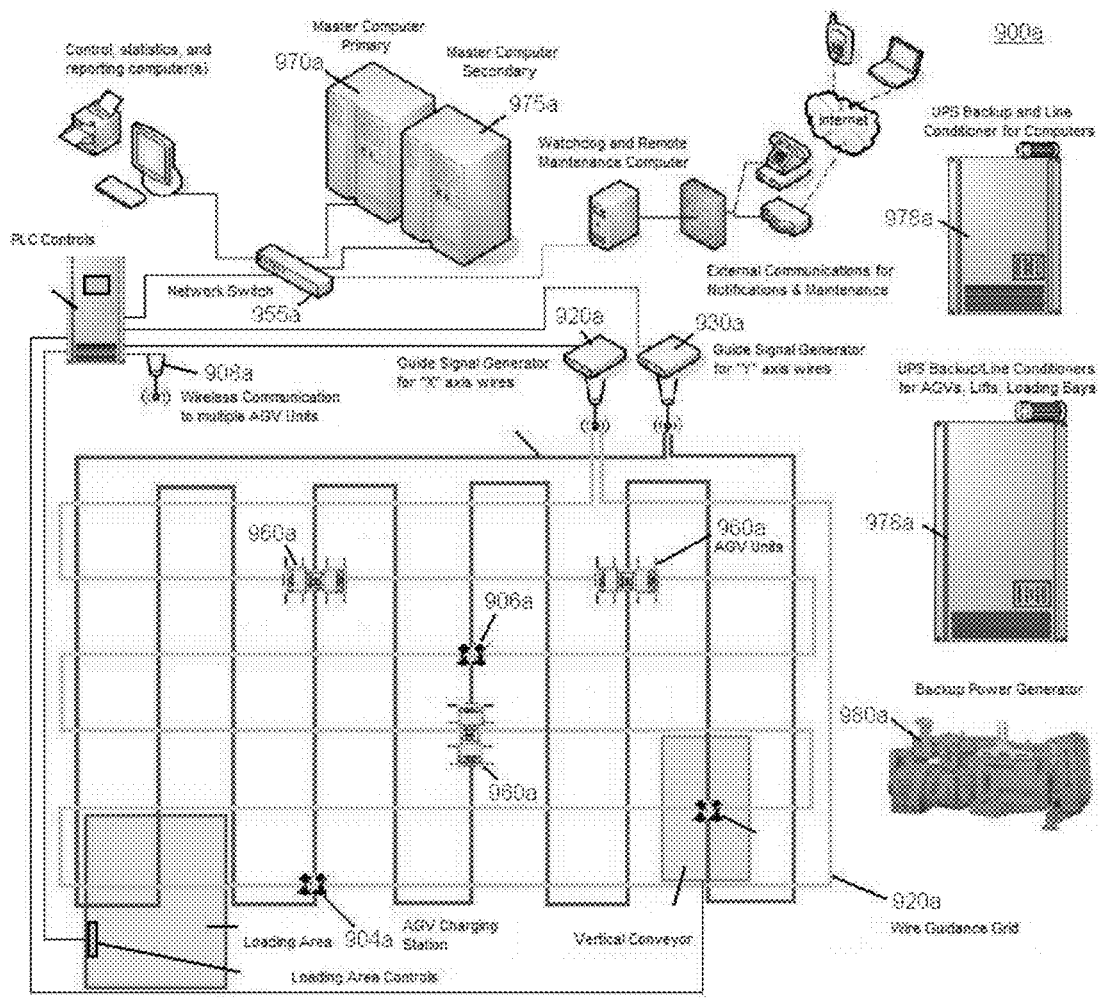
FIG. 14B is a diagram of one embodiment of a control system constructed in accordance with the invention.

FIG. 3 illustrates one embodiment of an AGV 100 of the present invention centered over an in-floor mounted guide wire system having an "X"-axis guide wire 70 and a "Y"-axis guide wire 75, it being understood that the guidance system as a whole is preferably comprised of a network or matrix of guide wires attached to a central control system (see FIGS. 14A and 14B). The AGV 100 further comprises a plurality of antennas 110, 120, 130, and 140 that are designated for purposes of easy reference as front antenna 110, rear antenna 120, upper antenna 130, and lower antenna 140. As will be described in greater detail below, the arrangement of antennas aligned along both the X- and Y-axes provides one aspect for greater flexibility in movement and guidance of the AGV 100 relative to the guide wire network.

Figure 4:
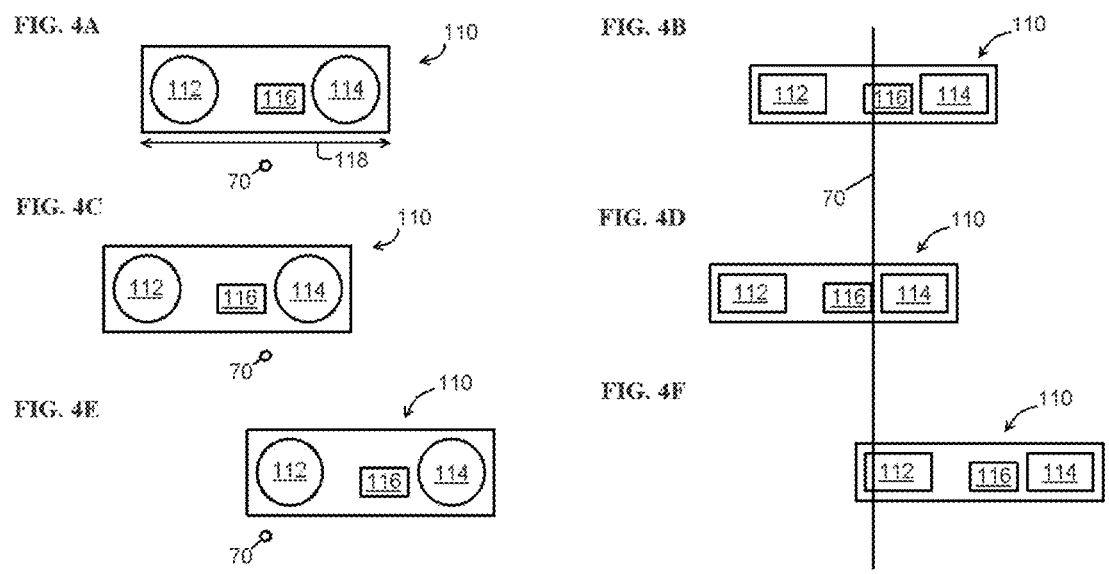
FIG. 4 (FIGS. 4A-4F) illustrate elevation and plan views of one antenna from FIG. 3 showing a two coil version with a programmable onboard microprocessor enabling an AGV to track at an offset relative to an in-floor guidance wire.

FIGS. 4A-4F illustrate one embodiment of one of the enhanced antenna arrays of FIG. 3, which for purposes of explanation will be referred to as antenna 110 or the front antenna 110 from FIG. 3. FIGS. 4A, 4C and 4E are elevations and FIGS. 4B, 4D and 4F are plan views of antenna 110. However, it will be appreciated that the same configuration could be applied to each antenna on AGV 100. The antenna 110 of the embodiment of FIGS. 4A-4F further comprises a plurality of inductor coils 112 and 114 and a programmable onboard microprocessor 116 enabling the AGV 100 to travel at an offset relative to the in-floor guidance wire 70. While only two inductor coils 112 and 114 are shown, more than two inductor coils are contemplated as will be described below. Inductor coils 112 and 114 in the antenna 110 generate an output voltage as in a conventional AGV antenna, and are used to keep the AGV 100 centered over the guidance wire 70 when desirable. In one embodiment, the onboard programmable microprocessor 116 receives and performs a mathematical analysis of the inductor coil output currents, then produces a new output signal of its own. This enables the AGV 100 (FIG. 3) to travel with its antennas 110, 120, 130 and 140 centered over the guidance wire 70 as shown in FIGS. 4A and 4B, or intentionally shift a controllable and variable distance to either side of the guidance wire 70 as shown in FIGS. 4C through 4F, while still reliably following the guidance wires. This offset from the center line could extend up to, and slightly beyond, the width 118 (FIG. 4A) of the antenna array 110 if desired.

FIGS. 5A through 5C illustrate elevation views of an alternative embodiment of an antenna array 210 for use with an AGV 100 that is positioned relative to a guide wire 70. Antenna 210 further comprises a plurality of inductor coils 220, 230, 240, 250, 260 and 270 positioned relative to a center line 212 of the antenna 210, and an onboard programmable microprocessor 280. In one aspect, the onboard programmable microprocessor 280 analyzes the output from the array of inductor coils 220-270 to keep an AGV centered over an in-floor guidance wire 70 when that is desirable as shown in FIG. 5A. Alternatively, the onboard programmable microprocessor 280 can allow an AGV equipped with an antenna 210 to intentionally and precisely follow a course shifted off of the center line 212 relative to the guide wire 70 as shown in FIGS. 5B and 5C. The plurality of inductor coils 220-270 coupled with the onboard programmable microprocessor 280 allows an AGV to seamlessly shift its location over the guidance wire 70 to any position along the length of the array of inductor coils so as to shift the center line 212 of the AGV a precisely controllable amount in relation to the guidance wire 70, far beyond the distance at which a conventional AGV guidance antenna would be able to detect the magnetic field produced by the frequency carried through the guidance wire 70.

In one embodiment of the invention, the antenna array 200 is capable of sensing multiple frequencies simultaneously of a single guidance wire 70 or multiple guidance wires. When multiple frequencies are utilized the system control computer instructs the AGV to select the desired frequency. In accordance with another embodiment of the invention multiple guidance wires can be utilized. The wires may be operable at a single frequency or each wire may have a different frequency.

In accordance with the principles of the invention, the onboard programmable microprocessor 280 analyzes the outputs of the inductor coils 220-270 in the antenna array 210 and assigns a value to each point along the array relative to the output generated by each of the individual inductor coils. Each of coils 220-270 has a unique index number and it outputs an alternating current (AC) that is a function of the proximity of the coil to the guidance wire 70 and the current magnitude in the wire 70. The output of each coil is processed by an electric circuit (not shown) adapted to generate a digital signal that can be analyzed by the microprocessor 280. In an exemplary embodiment, this can be achieved by rectification of the AC signal to produce a DC signal, and then converting the DC signal into a digital signal using an A/D convertor.

The microprocessor 280 generates a position value representing the location of the antenna 210 relative to the guidance wire 70. The position value is determined based on a pair of coils 220-270 having the strongest signals. This approach reduces the dependency in the electromagnetic field of the guidance wire 70.

Figure 20:
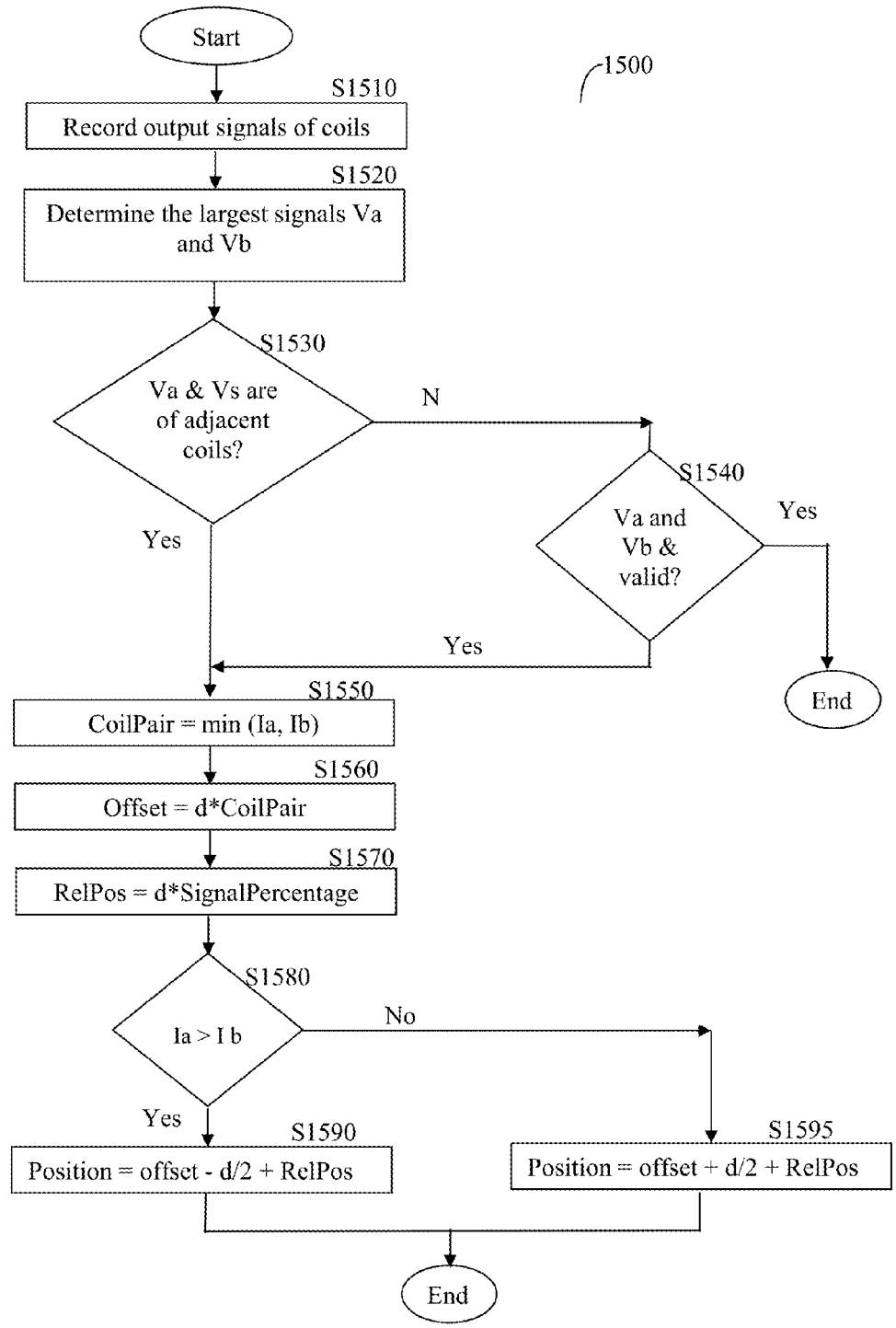
FIG. 20 is a flowchart describing the process for computing the position value as performed by the microprocessor in accordance with an embodiment of the invention.

FIG. 20 shows an exemplary and non-limiting flowchart 1500 describing the process for computing the position value as performed by the microprocessor 280 in accordance with an embodiment of the invention. At S1510, digital signals corresponding to the output signals of each coil 220-270 are received and recorded by the microprocessor 280. Each coil's current is preferably sampled by an A/D at ~1000 times per second (although other sampling rates are contemplated), where the coil output is related to the proximity of the coil to the guide wire and current magnitude in the wire, and where each coil can be individually identified such that the microprocessor knows which signal is from which coil. At S1520, two of the recorded signals having the largest value are determined. These signals will be referred hereinafter as Va and Vb and the indexes of the coil producing signals Va and Vb will be referred to as Ia and Ib respectively. As mentioned above, each of coils 220-270 is associated with a unique index number. At S1530, it is determined whether the signals Va and Vb are from adjacent coils. If so, execution continues to S1550. If it is determined that signals Va and Vb are not from adjacent coils, the validity of such signal is checked at S1540 to determine whether the maximum signal, out of Va and Vb, is below a predefined threshold. If S1540 results with a negative answer, execution terminates; otherwise, execution continues to S1550.

At S1550, a CoilPair parameter is set to a value of the minimum of the indexes Ia and Ib of the coils. For example, if coil 240 and coil 250 are determined to be Ia and Ib, then the CoilPair parameter is set to 240. At S1560, an Offset value is computed by multiplying a coil separation distance (d) value by the CoilPair parameter, i.e., Offset=d*CoilPair. At S1570, the relative position (RelPos) between the selected pair of coils is computed by multiplying the coil separation distance (d) by a SignalPercentage value, i.e., RelPos=d*SignalPercentage. The SignalPercentage is the ratio between the maximum signal, out of Va and Vb, and the sum of the signals Va+Vb. The coil separation distance (d) is the distance between the coils 220-270. At S1580 a determination is made whether the index Ia is larger than the index Ib. If so, at S1590 the position is computed as follows:

Position=Offset−$d/2$+RelPos.

If it is determined at S1580 that index Ia is not larger than index Ib, the Position is computed at S1595 using the following equation:

Position=Offset+$d/2$+RelPos.

Figure 6:
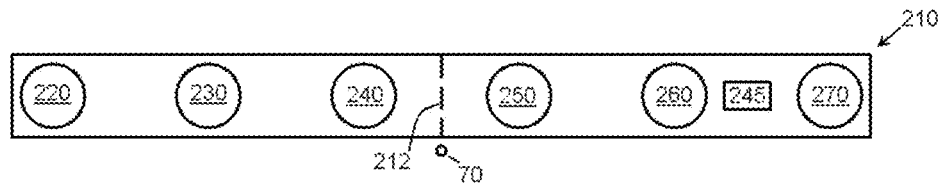
FIG. 6 (FIGS. 6A-6C) illustrates one embodiment of a control method incorporating the multiple coil antenna of FIG. 5.
Figure 6:
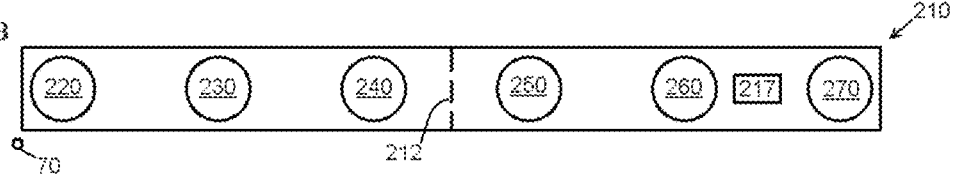
Figure 6:
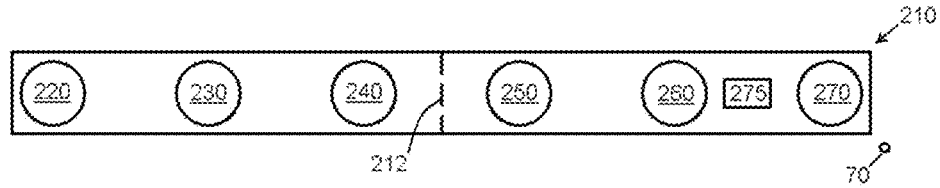

FIG. 6A-6C illustrate one embodiment of an analysis used to determine the relative positioning of an antenna 210 as shown in FIGS. 5A-5C from the center line 212 and the guide wire 70. The onboard programmable microprocessor 280 analyzes output from multiple inductor coils 220-270 in the antenna array and assigns a value to each point along the array relative to the output generated by each of the individual inductor coils. In the example shown in FIGS. 6A-6C, the centered relationship between the antenna array and the guidance wire 70 would produce a value of ~245 (i.e. centered between coils 240 and 250), though actual output numbering range could vary based upon the application or control system used. If an AGV travels off of the guidance wire 70 too far to the right for example, the analysis of the onboard programmable microprocessor 280 would so indicate and output a corresponding value or other appropriate form of communication signal to the AGV control system. In the example of FIG. 6B, a value of less than 220 indicates to the AGV control system that the AGV needs to travel to the left in order to return to a centered position over the guidance wire 70 as shown in FIG. 6A. If an AGV travels off of the guidance wire 70 too far to the left as shown in FIG. 6C, the onboard programmable microprocessor 280 generates an output which is indicative of its position. In the example of FIG. 6C, any value greater than 270 indicates to the AGV control system that the AGV needs to travel to the right in order to return to its centered position over the guidance wire 70 as shown in FIG. 6A. The extent to which an AGV may be displaced from a guidance wire 70 or the like will depend on a variety of factors, including but not limited to the frequency strength of the guidance wire 70, the sensitivity of the inductor coils and the manner in which such components are associated by the onboard programmable microprocessor.

The expanded reach of an antenna array as illustrated in FIGS. 6A-6C, for example, decreases the risk of an AGV experiencing off-wire shut down situations where the AGV loses control contact with the guidance wire network. AGVs equipped with the enhanced antennas as described herein have a much larger travel window while still maintaining contact with the magnetic field created by the in-floor guidance wire network. In addition, upon losing contact with the magnetic field created by the guidance wire, the control system enables a positive indication of which direction of travel is required to regain contact with the magnetic field created by the in-floor guidance wire system through the use of an indicator coil positioning value system as illustrated in FIGS. 6A-6C for example. Other control systems are contemplated. Thus, an AGV equipped with enhanced antennas and under an appropriate control system and method could perform maneuvers to return to the guidance wire without having to experience an off-wire shut down, which would necessitate human intervention. In addition, while conventional AGV systems may be designed to avoid travel lane paths and maneuvers that could produce an off wire situation, thus limiting some options for operational efficiencies, the control system and AGV of the present invention allows for more complex AGV maneuvers to be routinely performed without service interruptions and therefore allows more efficient operational performance and more efficient use of space.

Figure 7:
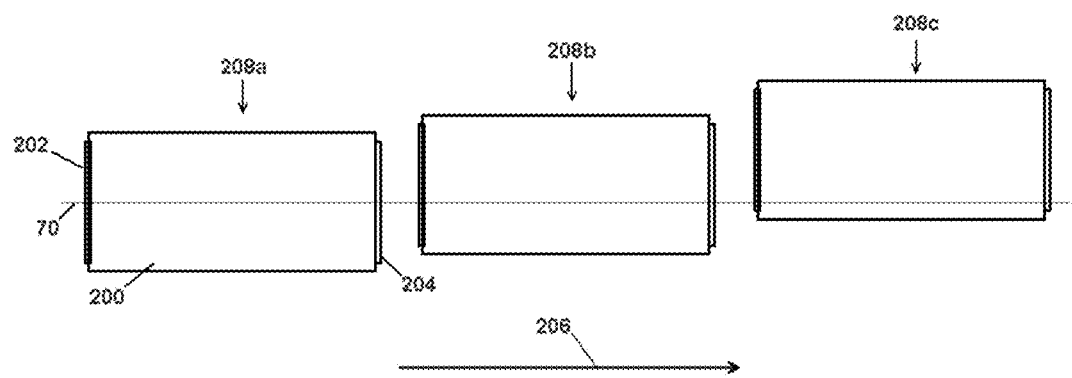
FIG. 7 illustrates one embodiment of an enhanced AGV having two variable offset positioning antenna arrays and various offset positioning relative to a guide wire.
Figure 8:
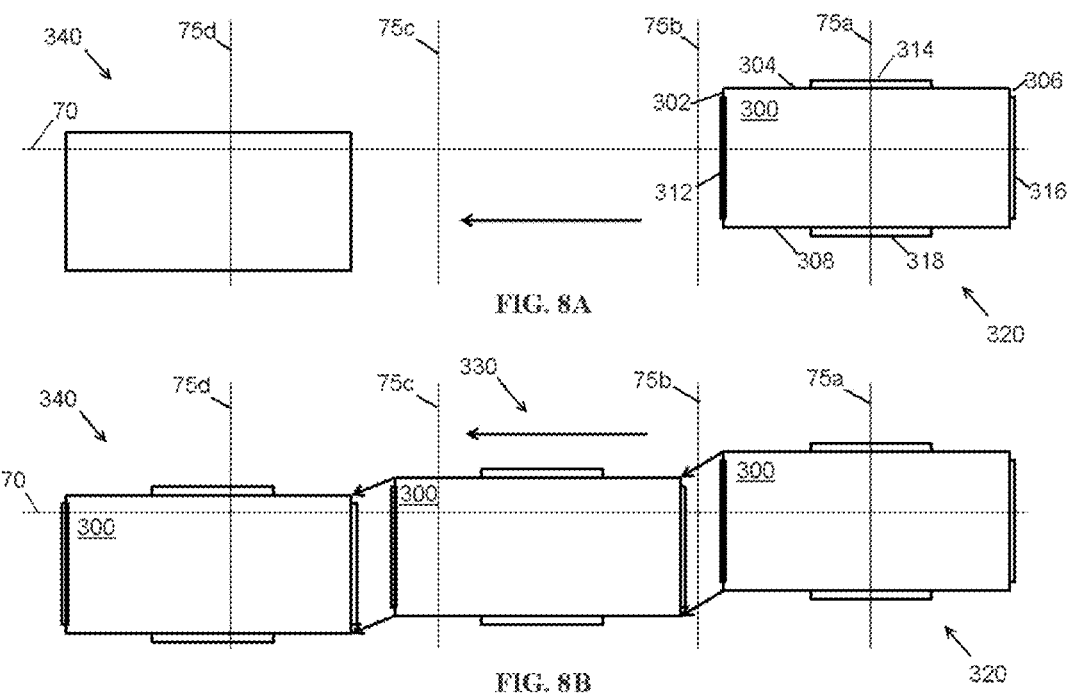
FIG. 8 (FIGS. 8A-8B) illustrates one embodiment of an enhanced AGV having four variable offset positioning antenna arrays and various offset positioning relative to X-axis and Y-axis in-ground guide wires.

FIGS. 7 through 8B illustrate two non-limiting embodiments of an AGV 200 and 300 illustrating aspects of the present invention, with the AGV 200 of FIG. 7 incorporating front and rear antennas 202 and 204 and the AGV 300 of FIGS. 8A and 8B incorporating a plurality of antennas 312, 314, 316 and 318 along each side of the AGV 300. FIG. 7 illustrates one embodiment of an AGV 200 positioned relative to a guide wire 70 and utilizing a front antenna 202 and a rear antenna 204 having a construction similar to the antenna 210 of FIGS. 5A through 6C including a plurality of inductor coils and an onboard programmable microprocessor (not specifically show). Thus, when AGV 200 moves along a guide wire 70 in the direction of travel indicated by arrow 206, the AGV 200 could move from a position 208a that is centered over the guide wire 70 (see, for example, the antenna of FIG. 5A), to a position 208b that is slightly offset relative to the wire 70 (see, for example, the antenna of FIG. 5B), to a position that is considerably offset relative to the wire 70 (see, for example, the antenna of FIG. 5C). In the embodiment of FIG. 7, the AGV 200 can operate with only the front antenna 202 providing guidance information, or by using both antennas 202 and 204 to confirm both the leading and trailing edges of AGV positioning and guidance.

FIGS. 8A and 8B illustrate one embodiment of an AGV 300 positioned relative to an X-axis guide wire 70 and a plurality of Y-axis guide wires 75a, 75b, 75c and 75d, the AGV 300 utilizing a plurality of antennas 312, 314, 316 and 318 along each side 302, 304, 306 and 308 respectively of the AGV 300. Each of the antennas 312, 314, 316 and 318 preferably has a construction similar to the antenna 210 of FIGS. 5A through 6C. FIG. 8A illustrates AGV 300 in a first location 320 centered over guide wires 70 and 75a and spaced from a target location 340 of the AGV that is offset from both the X-axis guide wire 70 and the Y-axis guide wire 75d. As will be described below, the offset positioning of an AGV relative to a guide wire network can occur for a variety of reasons, such as, for example, if the AGV needs to acquire a load (see FIG. 9) that is not centrally positioned relative to the guide wire network. FIG. 8B illustrates the movement of the AGV 300 from the first location 320 to an intermediate location 330 and then to the target location 340. Movement along the X-axis guide wire is controlled by the interaction of the antennas 312 and 316 with the onboard programmable microprocessor (not shown) and the AGV control system (not shown), where the antennas 312 and 316 shift the position of the AGV 300 relative to the X-axis guide wire 70. A determination of the positioning of the AGV 300 relative to the Y-axis wires 75a-75d also guides the AGV 300 from the first location 320 to the target location 340 where, for example, the antennas 314 and 318 monitor or count the Y-axis wires 75b and 75c passed to indicate the positioning of the AGV 300 relative to the Y-axis network and to ensure that in the embodiment of FIG. 8B the AGV 300 stops along the Y-axis wire 75d. Thus, FIG. 8B demonstrates one embodiment of a control method used to allow an AGV 300 to follow a guidance wire 70 in the direction of travel with one pair of antennas 312 and 316 while sensing the location of guidance wire cross wires 75a-75d using another pair of antennas 314 and 314, and utilizing output from both pairs of antennas to determine the AGV's exact location within a grid of guidance wires and travel to an exact position within the guidance wire grid expressed as a specific relationship to the position of specific X and Y axis guidance wires.

FIGS. 7 through 8B illustrate aspects of the invention of an AGV equipped with two or more pairs of antenna arrays that is capable of traveling through a storage or travel area equipped with multiple axes of an in-floor guidance wire grid and to follow and track, centered or at variable offsets, multiple axes of wires within the grid to reach an exact target location specified by a control system. The travel path is generally dictated by a control system (see FIGS. 14A-14C) which could instruct the AGV to follow the grid pattern (i.e. travel so far in the X direction, then so far in the Y direction), or to cut across grid lines at an angle as described in connection with FIG. 26 below to arrive at the designated location by the most efficient or most preferable path available. As will be described below, this is very advantageous in an AGV-based storage or warehousing application where travel lanes and storage spaces could be dynamically sized, laid out, and assigned based upon current needs and the size, shape and transfer plan for a specific item or items to be stored, rather than having to be determined ahead of time for a limited number of anticipated purposes during the storage system design process. This also allows AGV-based storage systems to be far more flexible and accommodating than non AGV-based systems currently in use and drastically improve their cost efficiency and longevity of operation.

Figure 9:
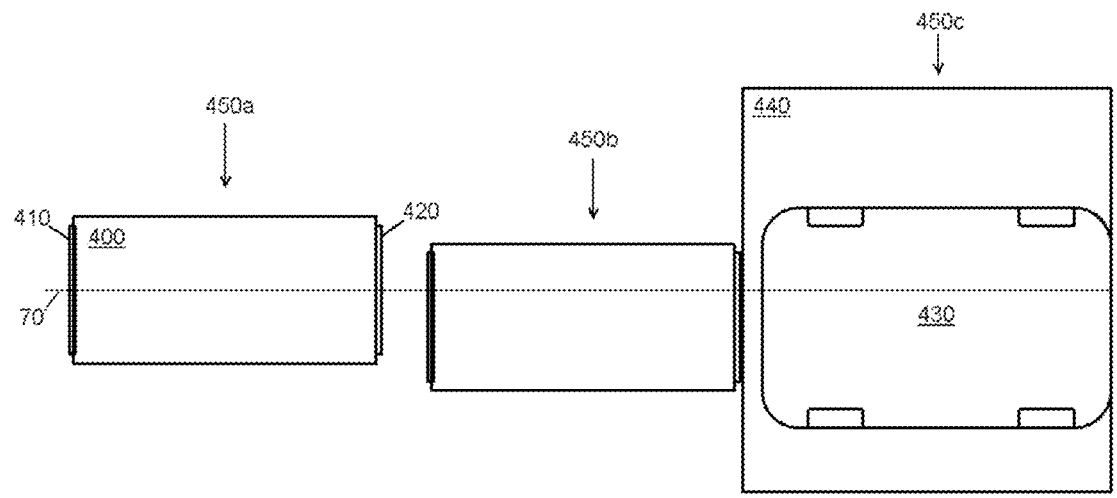
FIG. 9 demonstrates one embodiment of an AGV that acquires an off-centered load, the AGV being capable of traveling at an offset to a central guidance wire.

FIG. 9 illustrates one embodiment of an AGV 400 having antennas 410 and 420 to travel along a guidance wire 70 to acquire an off-centered load 430 (an automobile in this example) within a loading area 440. The AGV 400, with control and guidance from other devices, sensors, measuring implements, or human intervention, could shift from a centered position 450a in relationship to the guidance wire 70 to an offset position 450b in order to approach and acquire the target item 430 along position 450c, which is not situated exactly centered relative to the in-floor guidance wire 70. This aspect could be used to handle irregularly shaped items or items which were placed imprecisely by imperfect human or mechanical operations. For example, items unloaded into an automated warehouse by human workers and not placed exactly on center in a loading area could have their exact position detected by sensors within the loading area or communicated by human workers through a human machine interface system, and an AGV equipped with the antennas and control system of the present invention could shift off center as needed to correctly approach and acquire the target item, then shift back on center or to an appropriate offset as needed, to transport the acquired item to the appropriate location within the system. In an automated parking example, where an AGV is used to acquire an off-center target vehicle in a loading area, for example, the ability of the AGV to travel offset to a guidance wire effectively centers the AGV relative to the vehicle it is intended to acquire. Thus, the AGV would then travel into position below the target vehicle, lift it for transport, then return as desired to a position of being centered on the guidance wire, or offset the appropriate amount to travel with the automobile on board as indicated by the automobile's distinct characteristics and the preferred path of travel out of the loading area.

Figure 10:
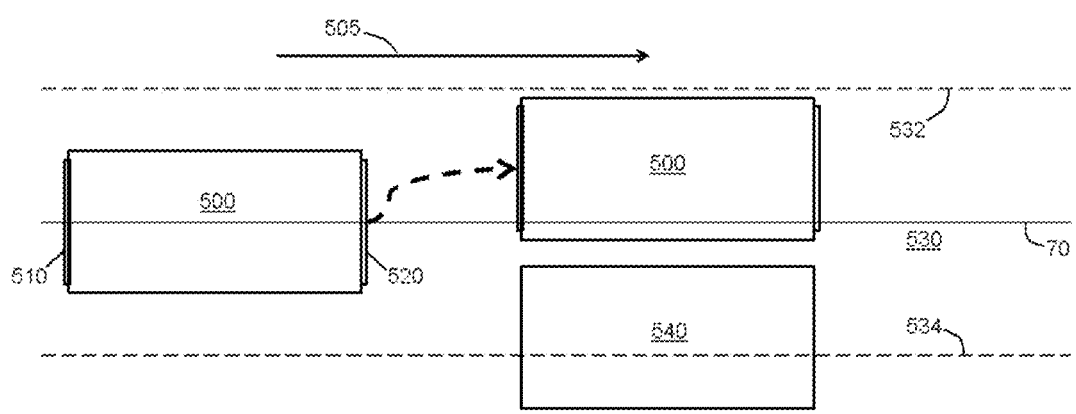
FIG. 10 demonstrates one embodiment of an AGV traveling at an offset to a central guidance wire enabling it to traverse around an obstacle blocking a travel aisle.

In addition to simply acquiring off-center loads, the ability to dynamically shift the position of an AGV relative to the location of the guidance wire is also very beneficial in diminishing disruptions of operations due to temporary mechanical failures or obstacles within an AGV system. If a disabled piece of equipment or a temporary obstacle such as on oil spill, building damage, repair work, or the like should interfere with or partially block a portion of a travel lane, under conventional methods of operation that section of the travel lane would need to be entirely shut down. However, if remaining space within the travel lane allows, AGVs equipped with the antenna array and/or control method of embodiments of the present invention could simply be directed to shift as required on the guidance wire when passing this particular point in the system as shown in FIG. 10, for example, and continue at least limited travel operations through that area until the source of the obstruction had been removed or repaired. FIG. 10, for example, illustrates an AGV 500 having antennas 510 and 520 and that is centered over a guidance wire 70 within a travel lane 530 defined by boundaries 532 and 534. When the AGV 500 encounters an obstruction 540 along its travel direction 505, the control system (not shown) in conjunction with the antennas 510 and/or 520 enable the AGV 500 to dynamically shift its position relative to the guidance wire 70 a sufficient amount in order to clear the obstruction 530 and still remain within the boundaries 532 and 534 of the travel lane 530.

Figure 11:
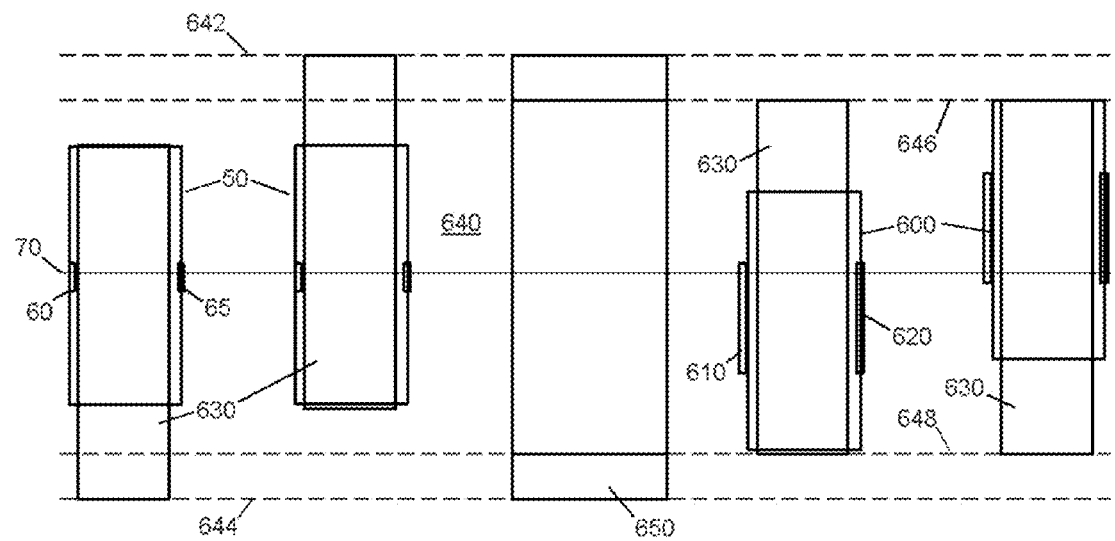
FIG. 11 demonstrates a comparison of a conventional AGV with one embodiment of an AGV of the present invention showing the utilization of a narrower travel lane for the AGV of the present invention.

FIG. 11 illustrates a comparison between the use of a conventional AGV 50 (see also FIG. 1) and the space-saving advantage gained by using one embodiment of an AGV 600 incorporating an antenna array 610, 620 and control method of the invention when carrying an asymmetrical load 630 down a travel lane 640, or onto and off of a conveyor 650, or into a storage location, for example. The ability to dynamically shift the position of the AGV 600 into an offset position relative to a guidance system within a travel lane enables the use of a narrower overall travel lane or smaller conveyor system or smaller storage location as the case may be. In one example of one embodiment, the conventional AGV 50 picks up automobile 630 by lifting under the automobile's tires as described in connection with U.S. Patent Application 61/145,543, filed Jan. 17, 2009, and incorporated herein by reference, carrying the automobile 630 sideways down a travel lane 640 (perpendicular to the automobile's normal forwards/backwards travel orientation) using conventional AGV guidance antenna 60 and 65 (see also FIG. 1), and proceeds along the travel lane 640 with the guidance wire 70 centered under the AGV 50, which would in turn be centered under the automobile's wheel base. In one specific example, assume that the largest vehicle to be accommodated in an automated AGV based parking system is a 1999 General Motors "Suburban" Sports Utility Vehicle. This vehicle is 219.9 inches long, and has a front overhang (center of front wheel to farthest front extension of the automobile) of 36.2 inches and a rear overhang (center of rear wheel to farthest rear extension of the automobile) of 52.8 inches. In order for the AGV 50 to be able to carry this vehicle 630 down the travel lane 640, facing in either direction (i.e. facing "forward" or "backward" within the lane), the minimum allowable space required would be 219.9 inches plus the difference in front and rear overhangs (16.6 inches), or a total of 236.5 inches plus any required clearances for safety factors, and thus the travel lane 640 would have a minimum width defined by boundaries 642 and 644 as shown in FIG. 11. This same additional 16.6 inches of length would need to be added to each storage space which could accommodate this automobile, and to each conveyor 650 which would transport it between levels within a parking structure. This results in approximately 7.5% more building footprint, mechanical space, building materials, and associated construction costs to accommodate the vehicle 630 within the system than the actual exact physical size of it would require. However, by using an embodiment of the AGV 600 of the present invention to shift the point on the antenna arrays 610, 620 at which the AGV 600 is following the guidance wire 70 precisely 8.3 inches of offset towards the rear of this automobile 630, the travel lane 640, storage spaces, and conveyors can be set at the actual maximum automobile size of 219.9 inches, plus any required clearances for safety factors, and have a minimum width defined by boundaries 646 and 648. In a large parking structure or automated warehouse, 7.5% savings in real estate and construction costs can equal hundreds of thousands of dollars per project.

Figure 12:
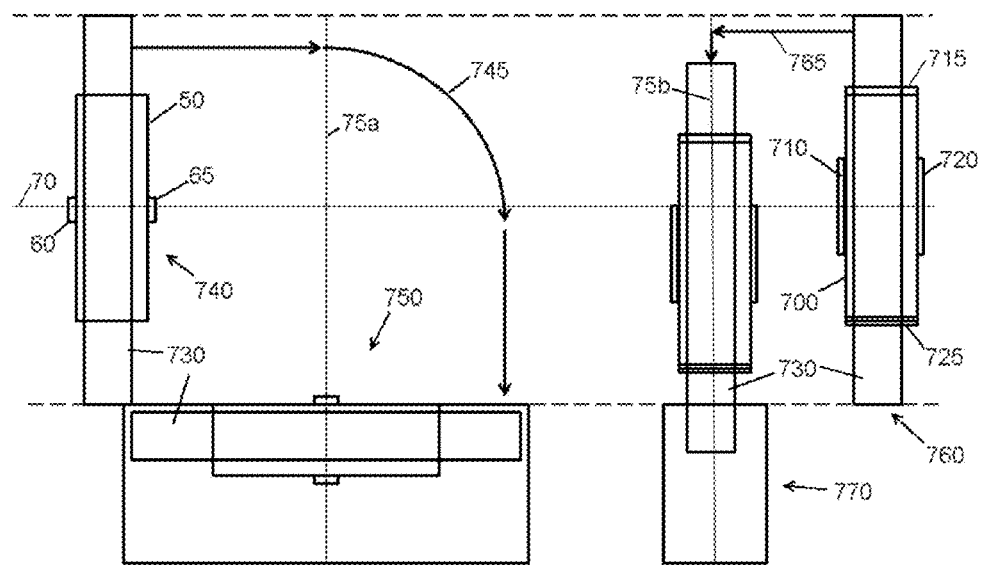
FIG. 12 demonstrates another comparison of a conventional AGV with one embodiment of an AGV of the present invention demonstrating the advantage of the AGV of the present invention and using its control method to being able to transport asymmetrical items which might be long and narrow by following one wire axis down a travel lane that is wide enough to accommodate the length of the item, then shifting sideways and following a different wire axis into narrower storage lanes and/or storage racks without having to allow for room to turn the AGV or the load into the storage aisles.

FIG. 12 illustrates a comparison between the use of a conventional AGV 50 (see also FIG. 1) and the space-saving advantage gained by using one embodiment of an AGV 700 incorporating an antenna array 710, 715, 720 and 725 and control method (not shown) when carrying a load 730 that is asymmetrical or long and narrow as shown, for example. As shown on the left side of FIG. 12, if it is desired to move the load 730 with a conventional AGV 50 from a first position 740 to a second position 750, or from guide wire 70 to 75a, the AGV 50 must first travel along the guide wire 70 using antennas 60 and 65 until the AGV encounters guide wire 75a, at which point the AGV 50 must rotate, clockwise in this example, along a travel path 745 so that the antennas 60 and 65 can acquire the guide wire 75a for guidance of the AGV 50 along guide wire 75a. Thus, when switching directions between an X-axis guide wire such as 70 and a Y-axis guide wire such as 75a, the travel lane or footprint must be dimensioned to accommodate the largest dimension of the load 730 in both directions as shown. However, as shown on the right side of FIG. 12, if it is desired to move the load 730 with an embodiment of the AGV 700 of the present invention from a first position 760 to a second position 770, or from guide wire 70 to guide wire 75b, movement along guide wire 70 toward guide wire 75b is controlled and guided using antennas 710 and 720. Upon contact of the AGV 700 with guide wire 75b, the AGV 700 shifts direction along guide wire 75b with antennas 715 and 725 assuming guidance and control of the AGV 700 along guide wire 75b. The AGV 700 may utilize an omnidirectional drive and steering mechanism as set forth in U.S. Application 61/248,448, filed Oct. 3, 2009, incorporated herein by reference herein, to shift the direction of movement of the AGV 700 between axes 70, 75b without altering the position of the load 730 as required with the conventional AGV 50 as shown on the left side of FIG. 12. Thus, movement of the same load 730 with the enhanced AGV 700 from an X-axis direction to a Y-axis direction requires a much smaller travel lane 765 and a much more compact travel footprint that need only be dimensioned to accommodate the smallest dimension of the load 730 or of the AGV 700, without having to allow for room to turn the AGV 700 or load 730 and without necessarily requiring, nor precluding, the use of other forms of sensors to confirm the AGV's physical location at the junction of the guide wires 70 and 75b for example.

FIGS. 13-19D illustrate non-limiting embodiments of an AGV in an automated storage facility of the type that stores automobiles or the like. In one example, an automated parking facility includes loading areas for drop-off and pick-up of vehicles by customers and storage areas for such vehicles that are preferably routinely accessed only by AGVs or the like.

While a parking facility is shown and described for purposes of convenience, it will be appreciated that the embodiments of the AGV guidance and control system of the present invention could be used to transport any type of load from a first position to a second position along a variety of travel lanes under the control and guidance of a control system and network of control means such as structural, in-floor guidance systems and/or wireless systems or combinations of the same. Other control means are contemplated. The system of the present invention enables more efficient use of space overall and in particular in the manner of travel throughout the system footprint, with respect to boundaries and obstructions, and in the positioning, placement and access of storage positions. The omnidirectional movement of the AGV combined with the enhanced antenna array and the ability to dynamically move into an offset condition relative to guidance systems wires or the like creates considerable flexibility in movement and positioning within travel and storage areas.

Figure 13:
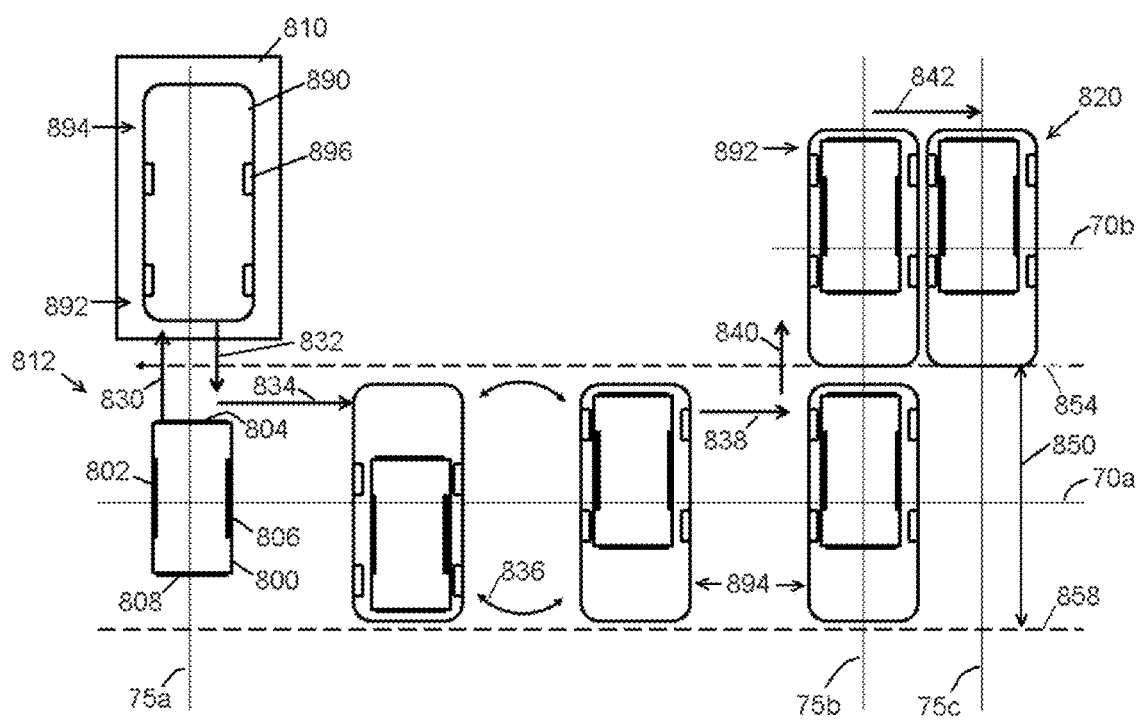
FIG. 13 demonstrates one embodiment of the use of an AGV of the present invention to transport and re-orient a load between a loading area and a storage area.

FIG. 13 illustrates one embodiment of an AGV 800, having antennas 802, 804, 806 and 808, that is used to acquire an asymmetrical item 890, in this case a vehicle with a different front overhang 892 and rear end overhang 894, from a loading area 810 and transport the vehicle 890 to a storage area 812 and a particular storage location 820. The AGV 800 initially situated along the intersection of guide wires 70a and 75a travels along guide wire 75a under the control and guidance of antennas 804 and 808 until it acquires the vehicle 890 in the loading area 810, which vehicle 890 has been driven into the loading area 810 so that the front overhang 892 faces the storage area 812. The actual acquisition of the vehicle 890 by the AGV 800 can be accomplished using a plurality of gripping arms on the vehicle tires 896 as set forth in U.S. Application 61/145,543, filed Jan. 17, 2009, incorporated herein by reference, or by being parked upon a vehicle tray which the AGV could then pick up and transport as discussed, for example, in FIGS. 21-23. The acquisition of the vehicle 890 is illustrated by arrow 830 and the return of the AGV 800 with vehicle 890 to the guide wire 70 within travel lane 850 is illustrated by arrow 832. All of the antennas 802, 804, 806 and 808 preferably cooperate in conjunction with a control method and onboard programmable microprocessor during the return of the AGV 800 to the intersection of the guide wires 70a and 75a.

Because the AGV 800 in this embodiment is situated relative to the vehicle 890 by the tires 896 of the vehicle 890, the position of the AGV 800 may require a particular offset relative to the guide wire 70a in order to keep the front and rear overhangs 892 and 894 of the vehicle 890 within the boundaries 854 and 858 of the travel lane 850. The travel lane 850 is dimensioned to accommodate the width and length of most vehicles should it be desired to transport a vehicle in either orientation. Arrow 834 illustrates the movement of vehicle 890 along the travel lane 850 using the AGV 800 that is offset downward relative to the guide wire 70a with antennas 802 and 806 providing guidance and offset control of the AGV 800 during movement relative to the guide wire 70a. In the embodiment of FIG. 12, the AGV 800 rotates the vehicle 890 within the travel lane 850 along arrows 836 to reverse the orientation of the vehicle 890 relative to the travel lane 850, and to reverse the offset direction relative to the guide wire 70s, so that the vehicle 890 can be later returned to the loading area 810 and driven out of the loading area 810 in a forward direction. The rotation of the vehicle 890 also enables the vehicle 890 to be stored in a front-facing condition. While FIG. 13 illustrates rotation of the vehicle 890 within the storage area 810, it will be appreciated that rotation can occur in the loading area 810 through the use of a turntable (not shown) or the like, or alternatively the rotation need not occur at all if it is not important during the storage operation or, for example, if another loading area (not shown) is provided on the opposite side of the storage area 810 that allows departure of the vehicle in a forward direction. In an embodiment where rotation occurs within the storage area 810, a control system (not shown) may be utilized to determine the best location for rotation taking into consideration the dimension of the vehicle relative to the travel lanes and any potential obstructions that would otherwise prevent rotation in certain areas.

After rotation, the AGV 800 and vehicle 890 continues along the travel lane 850 in accordance with arrow 838 using a new offset value relative to the guide wire 70a until the AGV 800 reaches guide wire 75b using antennas 802, 804, 806 and 808 to verify position and direction of the AGV 800 relative to the guide wires 70a and 75b. In the present embodiment, the AGV 800 then follows guide wire 75b in accordance with arrow 840 while the antennas 804 and 808 are centered relative to guide wire 75b until AGV 800 reaches guide wire 70b. In order to appropriately position vehicle 890 relative to the storage location 820 along guide wire 75c, antennas 802 and 806 must assume an offset condition relative to the guide wire 70b so that movement of the AGV 800 in accordance with arrow 842 will result in the desired positioning of the vehicle 890 relative to the guide wires 70b and 75c. The ultimate placement of a vehicle 890 within a storage location (820 for example) can be determined by a variety of factors including, but not limited to the dimensions of the vehicle, the available space and the available travel lanes in and around the storage area 812. Thus, by using the antenna arrays 802, 804, 806 and 808 and control methods included in this invention (as illustrated in one possible example of many possible combinations of motions in FIG. 12), the AGV 800 and vehicle 890 could travel throughout the storage system along a guidance wire grid (see FIGS. 14A-14B) detecting X- and Y-axis wires and following travel lanes centered or offset relative to the guidance wires as needed until reaching a designated storage location at the correct offset position relative to and within the storage location to deposit the vehicle for storage. The operation of turning the vehicle could occur either on the way to storage or when travelling from storage to exit at the loading area as is most efficient in each system, but with the ultimate result of the vehicle being able to be driven into the system going forward and out of the system going forward, and turned by the AGV within the system, without having to make all travel lanes, vertical conveyors (not shown) and storage locations large enough to be able to accommodate vehicles with different front and rear end overhangs when facing in either direction.

FIG. 14A illustrates one embodiment of a system layout 900 including a storage facility 905 having a plurality of storage locations 910, a guidance wire grid formed from X-axis guidance wires 920 energized by an X-axis frequency generator 925 and Y-axis guidance wires 930 energized by a Y-axis frequency generator 935, a plurality of loading areas 940, a vertical conveyor 950 to move between vertically-stacked system levels (not shown), a plurality of AGVs 960, a control system 970 such as a PLC control system in wired and/or wireless communication 972 with AGVs 960 and controlling loading areas 940, vertical conveyors 950 and AGVs 960, and a server or some other type of control system 980 providing coordination, routing and inventory instructions to AGV system through the control system 970 or directly to the facility 905. The facility 905 is preferably provided with dedicated travel lanes such as, but not limited to travel lanes 990 and 992, for movement of AGVs 960 and vehicles (not shown) to be transported by AGVs 960 between the loading areas 940 and the storage locations 910.

FIG. 14B shows an exemplary and non-limiting diagram of an automated parking system 900a constructed in accordance with one embodiment of the invention. The system 900a locates and tracks the location of AGVs 960a and guides them to parking or storage locations from an access location using, in the illustrated embodiment, radio frequency identification (RFID) and proximity sensing techniques. Specifically, a vehicle (not shown) is mounted on an AGV 960a, which includes a plurality of antenna arrays that, in one embodiment, transmit radio frequency (RF) signals to a radio modem 908a. The antenna arrays keep the AGV 960a aligned along its path by sensing the position of guide wires 920a, 930a in the floor in relation to the antenna arrays of the AGV 960a. The guide wires 920a, 930a may be, for example, a RF wire or magnetic strip. Other guide means are contemplated. The intersection of two guide wires are referred to, in the embodiment of FIG. 14B, as storage bays 904a, each of which may include at least a RFID circuit 906a to determine the overall location of the AGV systems 960a. To determine the overall location of an AGV, an RFID chip may be used at each storage bay location and along predetermined intervals along pathways. Using these two sensing systems, the facility owner can precisely guide and track the location of each AGV 960a. In the present embodiment, charge stations are also provided to charge the batteries in the AGV during times of non-use. Other charging means are contemplated.

RF signals generated by the RFID circuits and/or proximity sensors are transmitted to one or more radio modems 908a which output data modulated in the RF signals to a computing device 970a. The radio modems 908a and the computing device may be connected in a network established using a network switch 955a. The computing device 970a coordinates the proper retrieval and parking (storing) of a vehicle or the like mounted on an AGV 960a from a storage location to an access or retrieval location, and vice versa. In order to move an AGV 960a from one location to another, the computing device 970a continuously processes the location information, as transmitted by the antenna array and/or RFID circuits, and generates signals that instruct the AGV 960a to follow a particular direction relative to the wire grid. The generated signals are wirelessly transmitted by the radio modem 908a to a wireless receiver installed in the AGV 960a.

In one embodiment of the invention a user can interface with the system 900a through, for example, a graphical user interface (GUI), an interactive voice response (IVR) interface, a web browser, SMS text messaging, and the like, enabling the user to access information about his/her vehicle, pay for parking and/or other services, check balances, provide retrieval instructions, etc. The user's inputs are processed by the computing device 970a. For example, the user may request that his/her car be ready for pick-up at a certain time. The computing device 970a then executes a process for retrieving the vehicle from its parking location to an access location to be ready for the user at the requested time. With this aim, the computing device 970a accesses a database (not shown) used to store the parking location of the vehicle, computes a path from the current location to the access location and communicates the path for the AGV 960a to take to retrieve the vehicle. The computing device 970a also computes the amount due for payments, where payments are made through a payment server (not shown). In one embodiment of the invention, the computing device 970a generates control data and statistical reports, and maintenance and notification alerts. In order to allow continuous operation of the system 900a and to prevent a single point failure, the system 900a includes a redundant computing device 975a for backing up the computing device 970a. In certain embodiments, uninterruptible power supplies (UPS) devices 978a and a backup power generator 980a are also utilized in the system 900a.

Figure 14C:
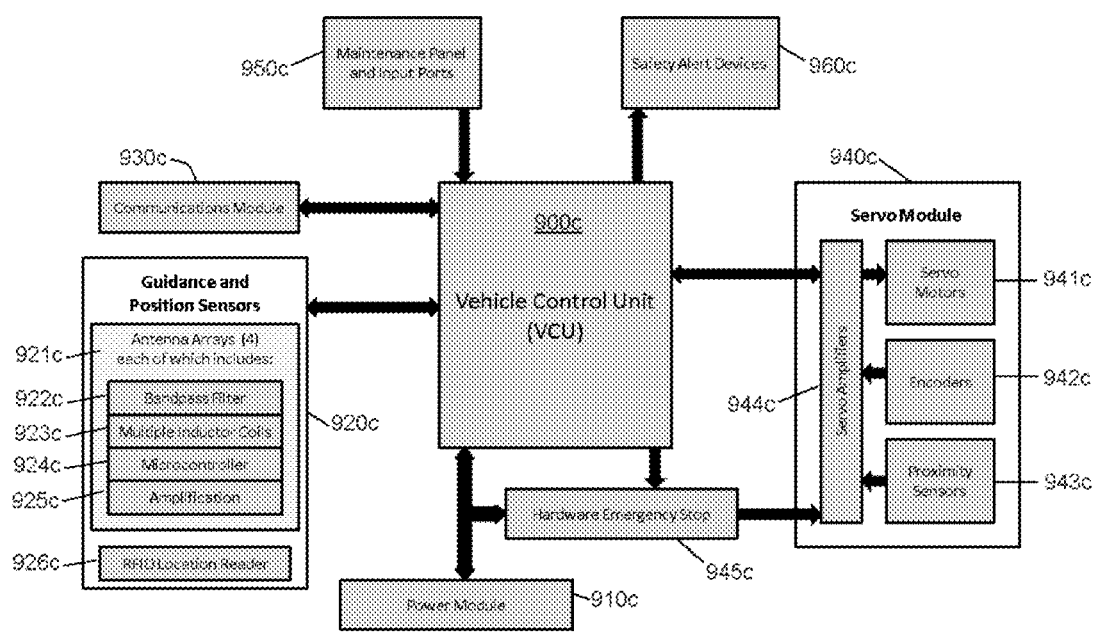
FIG. 14C is an exemplary and non-limiting block diagram of a control system in accordance with an embodiment of the invention.

FIG. 14C shows an exemplary and non-limiting block diagram of a vehicle control unit (VCU) processor 900c provided on an AGV (not shown). The VCU 900c communicates with a power module 910c, guidance and position sensors 920c, a communications module 930c adapted to transmit/receive signals from a computing device (such as device 970a from FIG. 14B) and a servo module 940c provided with servo motors 941c, encoders 942c, proximity sensors 943c and amplifiers 944c adapted to transmit and receive signals to/from the VCU 900c and a hardware emergency stop 945c. The guidance and position sensors 920c further comprises a plurality of antenna arrays 921c as described herein, each provided with a bandpass filter 922c, multiple inductor coils 923c, a microcontroller 924c and an amplifier 925c, and a RFID location reader 926c for reading the guide wire system. Also provided is a maintenance panel 950c for access to input ports and the like if it is desired to perform maintenance on or otherwise physically connect with the VCU 900c. The VCU 900c is adapted to process input signals entered through panel 950c and input ports, one example for such input signal being a RESET signal. The VCU 900c is further capable of producing safety alerts 960c, for example, such as routine audible or visual warning signals or event specific alerts based on inputs received from an obstacle avoidance module (not shown).

In one embodiment, the VCU 900c computes precise heading information for an AGV from feedback provided by the antenna arrays and the onboard microprocessor. Guide wire and wire cross locations as well as center points of storage locations are previously surveyed and stored in a database. The master computer processor uses laser scan data from the retrieval or loading bay to calculate travel offsets based on the offset of the vehicle from the wheelbase, where Offset= (Xwb−Xv)/2 (where Xwb is the dimension from the front of the vehicle to the center of the wheelbase, and Xv is the dimension from the front of the vehicle to the center of the vehicle). Offsets for guide wires paths, wire cross locations, and storage locations are determined by observation. Heading information is then used to compute vehicle yaw to correct for heading error. Each steering wheel is directed to an Ackermann angle to achieve the desired yaw. In one embodiment, the traffic master (master computer processor) creates a path of waypoints to the desired destination, where each waypoint consists of heading (vehicle travel direction), vehicle orientation, and path offset. These commands are preferably communicated to the AGV over wireless communication.

Figure 15:
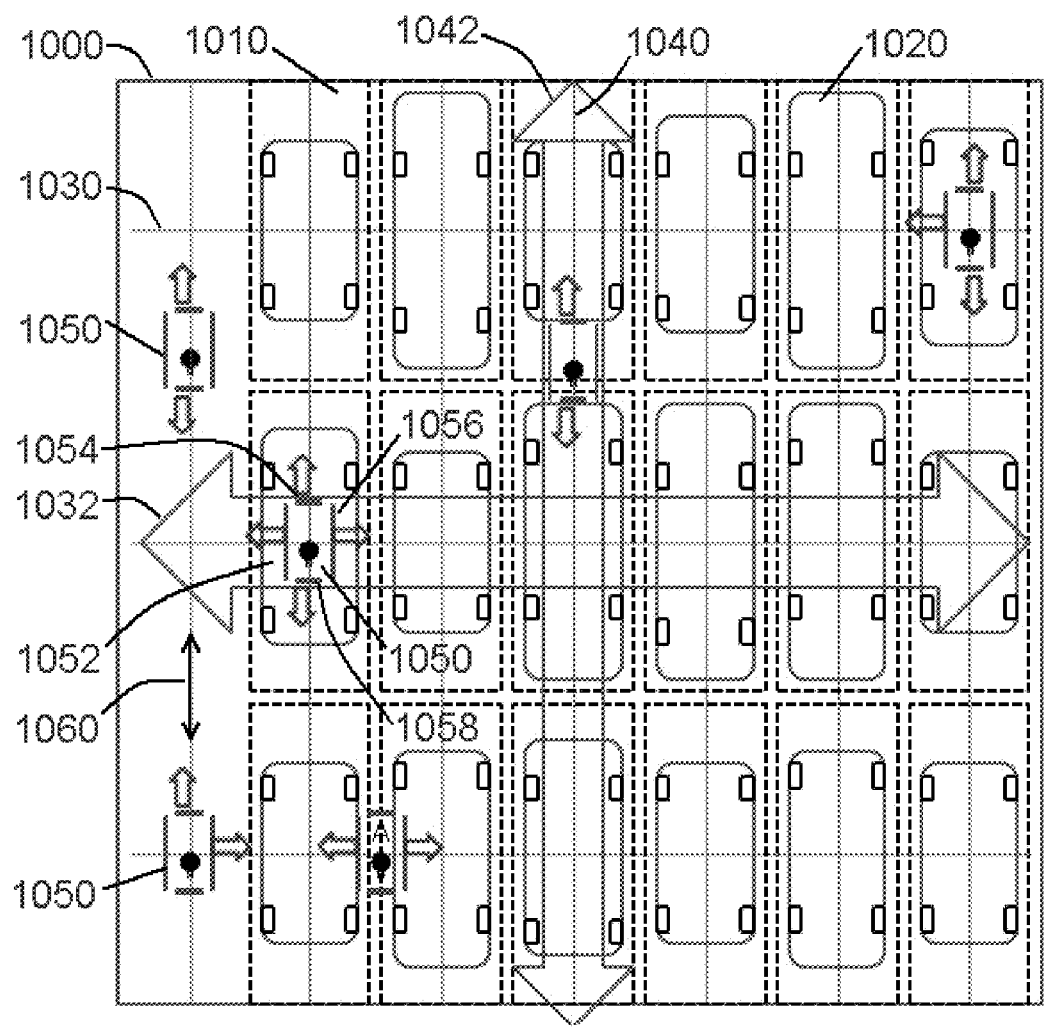
FIG. 15 illustrates one embodiment of a facility for use with an embodiment of the AGV of the present invention having storage arrangements and travel paths.

FIG. 15 illustrates one embodiment of a facility 1000 that comprises a plurality of storage locations 1010 occupied by a plurality of shapes 1020 representative of different sized vehicles with varying wheelbases and front/rear overhangs positioned in storage locations 1010. In the illustrated embodiment, the dashed line rectangles also represent and define the maximum possible vehicle size to be stored within a storage location 1010. Each storage location 1010 is defined by a portion of an X-axis guidance wire 1030 and a portion of an Y-axis guidance wire 1040 that are part of a larger guidance wire network within the facility 1000 for the guidance, positioning and movement control of AGVs 1050 within the storage locations 1010 and a dedicated travel lane 1060. The AGVs 1050 are each preferably equipped with a plurality of antenna arrays 1052, 1054, 1056 and 1058 as described above for omnidirectional movement that is either centered or offset relative to the guidance wire network. In the illustrated embodiment of FIG. 15, the vehicles 1020 are all centered relative to the X-axis and Y-axis guidance wires 1030 and 1040 respectively along their wheel base to form AGV travel lanes 1032 and 1042 (only two being shown) centered on the X-axis and Y-axis guidance wires 1030 and 1040 respectively. In a preferred embodiment, the longest dimension of an AGV 1050 when travelling in compact mode (the preferred mode of travel when the AGV is not carrying a vehicle) is shorter than the wheel base of all vehicles 1020 stored along a particular guide wire 1030 so that the AGV 1050 is capable of scooting under vehicles 1020 such that its longitudinal axis is oriented along either an X-axis guide wire or a Y-axis guide wire. In other words, movement of the AGV 1050 could occur with either the antennas 1052 and 1056, or with antenna 1054 and 1058 aligned with the X-axis guidance wire. With ultra-compact vehicles such as Smart™ cars with shortened wheel bases or the like, or in cases of vehicles with especially low undercarriage clearances it may be necessary to rotate the AGVs prior to scooting under the vehicles or to limit travel between the wheelbases of the vehicles in some portions of the facility.

One benefit of the overall control system of the present invention is that the structural elements of each vehicle, including size, wheel base, overhangs and the like are captured by system sensors and utilized by the control system of the invention to efficiently arrange vehicles relative to storage locations and/or other vehicles, and such information is also used for guidance of vehicles within travel lanes 1060 and relative to travel lane boundaries, obstructions and the like. Furthermore, the ability of AGVs to scoot under vehicles enables the facility 1000 to maximize storage location density and minimize the number of required travel lanes 1060. Another benefit of the overall system is that storage locations can be dynamically arranged and re-arranged depending on the structural dimensions of a vehicle and the available space in a particular storage location area. For example, three adjacent storage locations currently allocated to accommodate three maximum-size vehicles could be dynamically re-designed and re-allocated by the master control system to accommodate more than three smaller vehicles. Alternatively, a single storage location allocated to accommodate a single maximum-size vehicle could be dynamically re-allocated by the master control computer to accommodate two ultra-compact vehicles front-to-back or end-to-end as desired, for example. In addition, spaces around structural columns and like could be populated with grid wires to provide access to an AGV. Therefore, instead of assigning permanent and dedicated storage locations during system layout and creation, the master control computer can take advantage of the enhanced antenna array control and guidance system and wire grid network to dynamically assign spaces and storage locations to accommodate smaller or fewer objects or objects of varying configuration in real time and to adjust the storage capacities to meet demand as needed.

Figure 16:
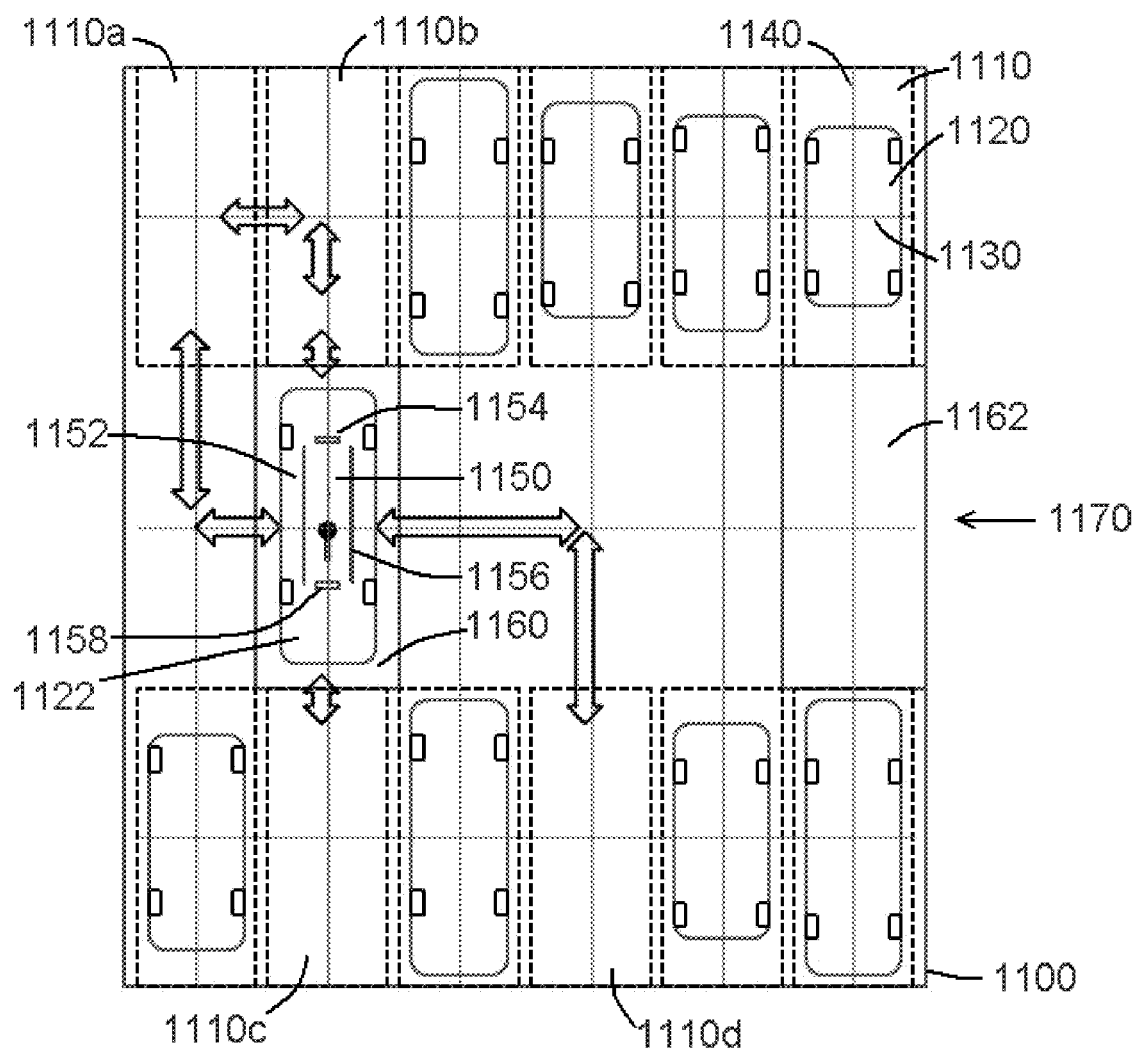
FIG. 16 illustrates various storage solutions for a load carried by an AGV of the present invention.

FIG. 16 illustrates one example of a facility 1100 that comprises a plurality of storage locations 1110 occupied by a plurality of vehicles 1120, X and Y guidance wires 1130 and 1140 respectively, an AGV 1150 having antennas 1152, 1154, 1156 and 1158, a plurality of conveyors 1160 and 1162, and a dedicated travel lane 1170. The AGV 1150 and vehicle 1122, upon exiting conveyor 1160, are able to travel to any of the open storage locations 1110a, 1110b, 1110c or 1110d. The ultimate determination of where vehicle 1122 is stored may depend of a variety of factors including, but not limited to the anticipated storage time of the subject vehicle 1122, anticipated storage times of other vehicles in the facility, load balancing of vehicles on a floor-by-floor basis, and so on.

Figure 17A:
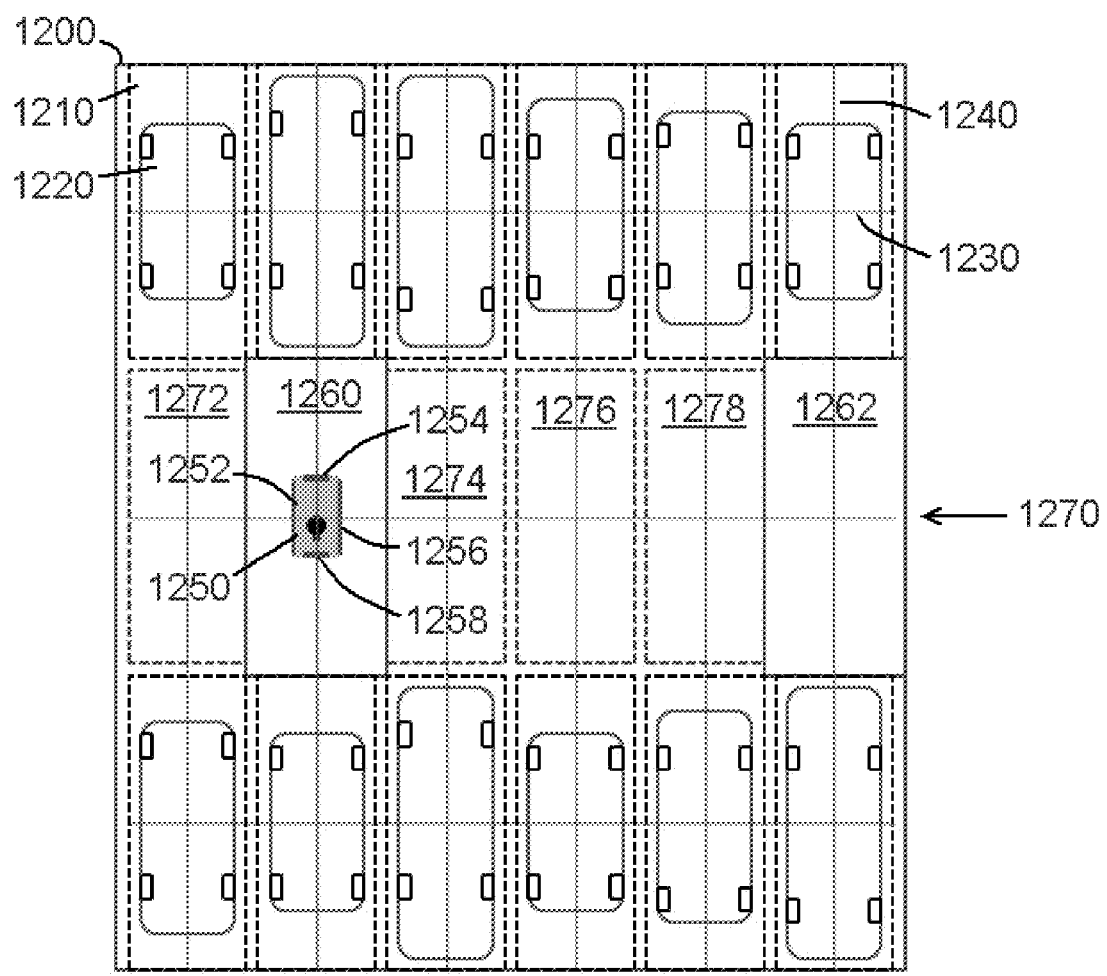
FIGS. 17A-17D illustrate one embodiment of a control method and use of an AGV to acquire a load from a storage location.
Figure 17B:
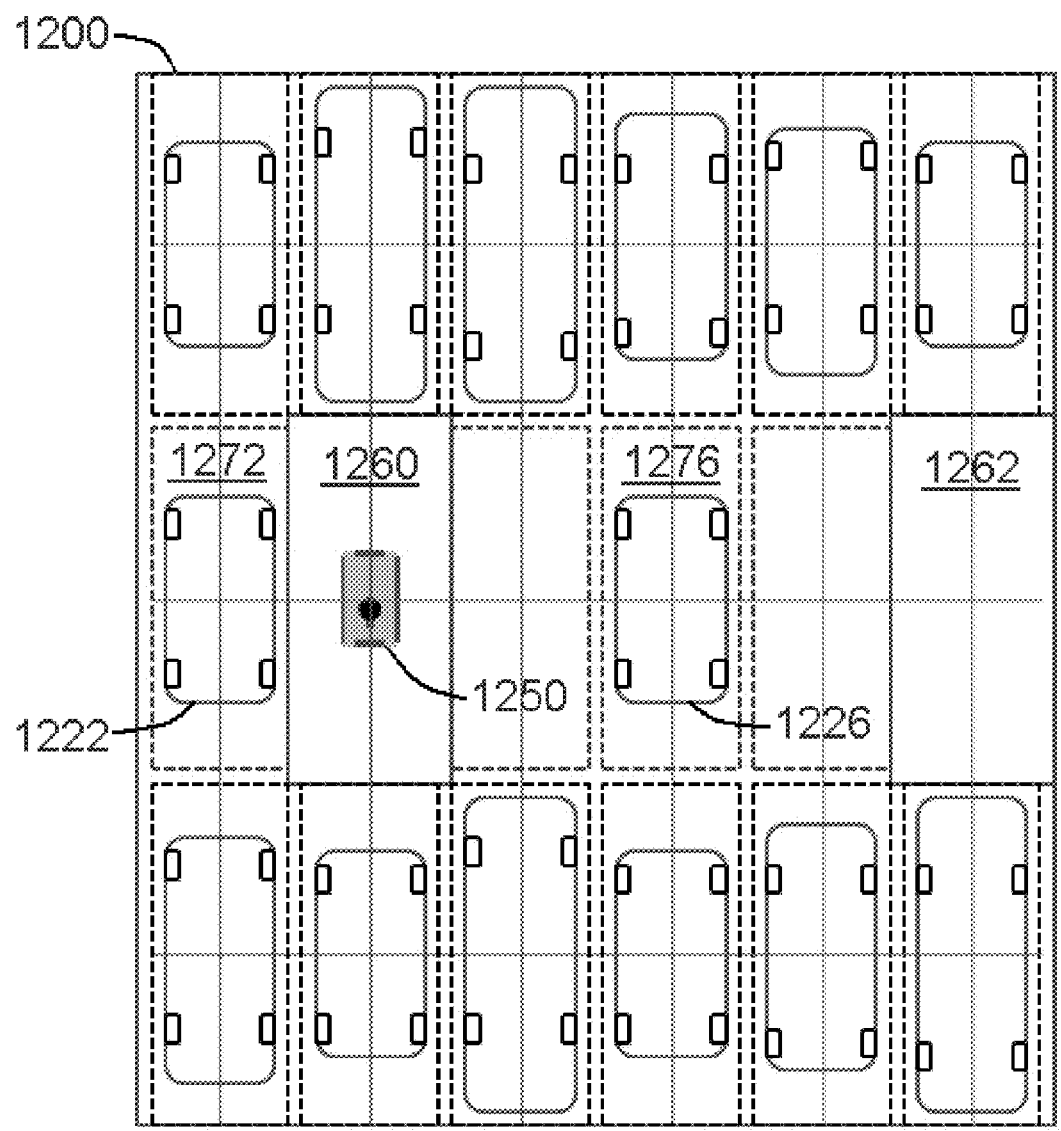
Figure 17C:
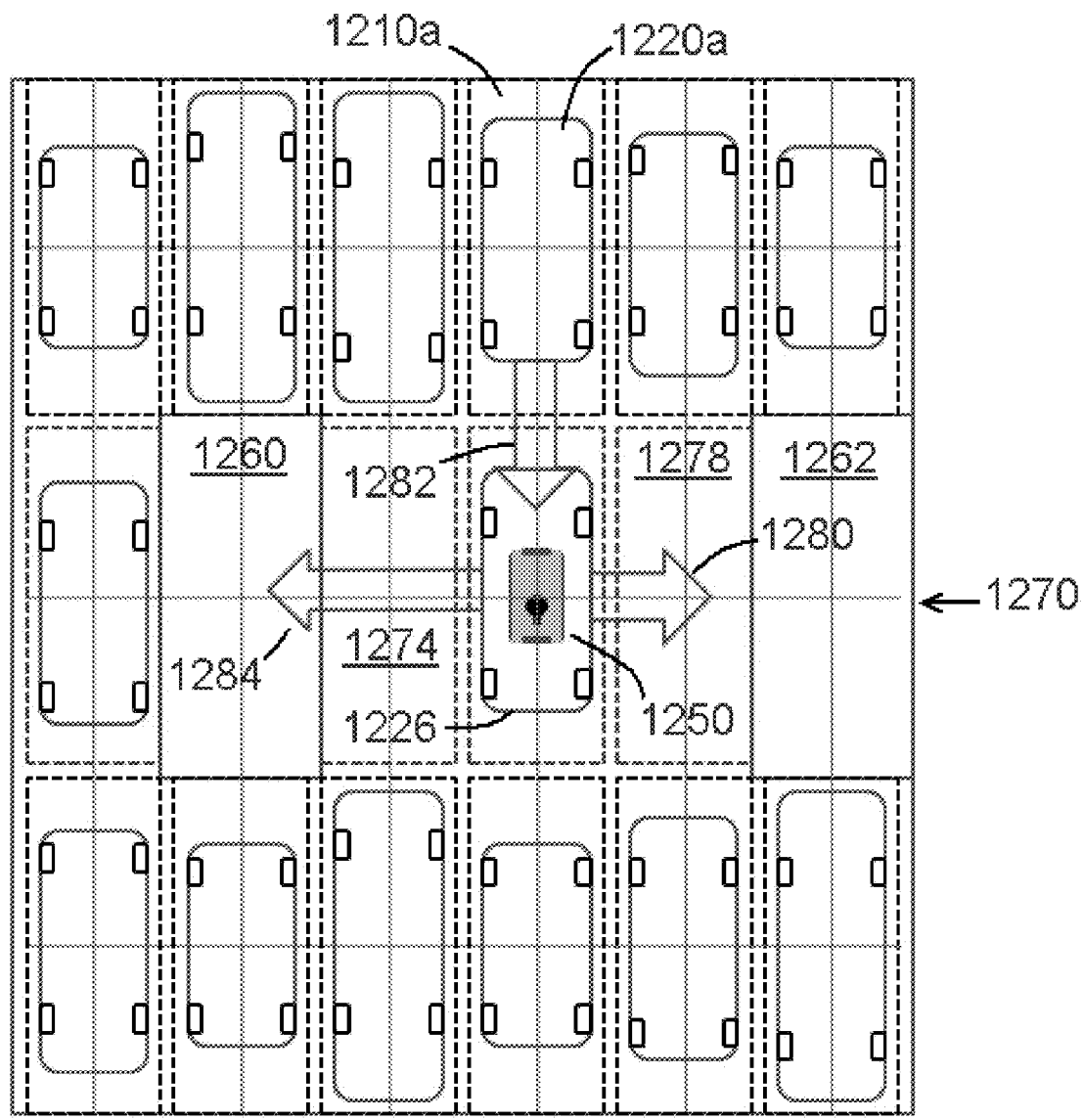
Figure 17D:
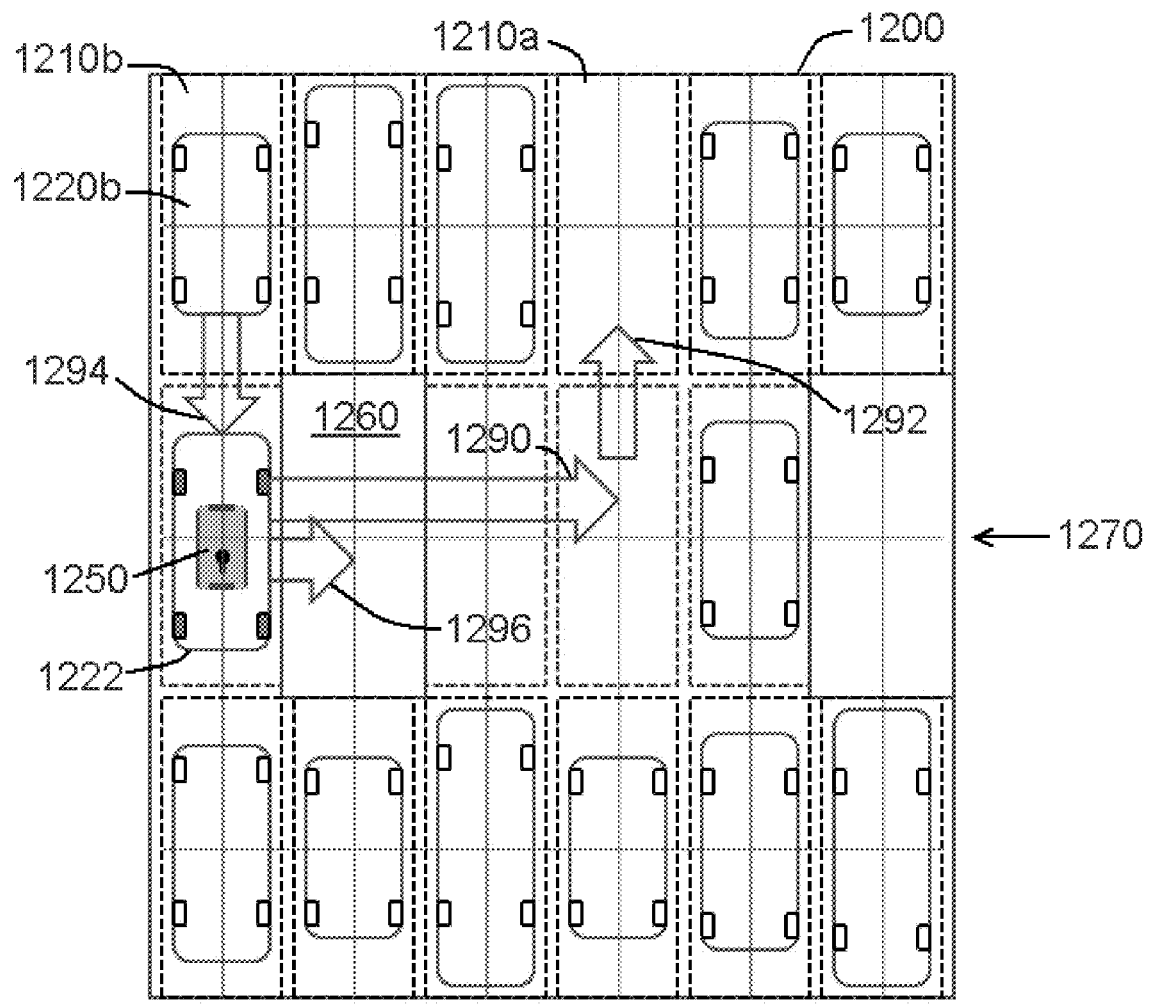

FIGS. 17A-17D illustrate one example of a facility 1200 that comprises a plurality of storage locations 1210 occupied by a plurality of vehicles 1220, X and Y guidance wires 1230 and 1240 respectively, an AGV 1250 having antennas 1252, 1254, 1256 and 1258, a plurality of conveyors 1260 and 1262, and a dedicated travel lane 1270 having a plurality of overflow locations 1272, 1274, 1276, 1278. FIG. 17B illustrates the storage of vehicles 1222 and 1226 in overflow locations 1272 and 1276 respectively. FIG. 17C illustrates the retrieval of vehicle 1220a from storage location 1210a, whereby AGV 1250 first picks up vehicle 1226 and delivers it to overflow storage location 1278 in accordance with arrow 1280, and then AGV 1250 acquires vehicle 1220a from storage location 1210a and delivers it to travel lane 1270 in accordance with arrow 1282, and then AGV 1250 delivers vehicle 1220a to the conveyor 1260 in accordance with arrow 1284. FIG. 17D illustrates the retrieval of vehicle 1220b from storage location 1210b, whereby AGV 1250 first picks up vehicle 1222 and delivers it to the now-empty storage location 1210a in accordance with arrows 1290 and 1292, and then AGV 1250 acquires vehicle 1220b from storage location 1210b and delivers it to travel lane 1270 in accordance with arrow 1294, and then AGV 1250 delivers vehicle 1220b to the conveyor 1260 in accordance with arrow 1296. Of course, in FIG. 17C, AGV 1250 could also first pick up vehicle 1226 and deliver it to overflow storage location 1274, and then AGV 1250 could acquire vehicle 1220a from storage location 1210a and deliver it to travel lane 1270, and then AGV 1250 could deliver vehicle 1220a to the conveyor 1262 instead of conveyor 1260. The movement of AGVs and vehicles is controlled by a master control system (not shown) through any of a variety of possible communication systems though most likely a wireless data network with receivers on the AGVs and any other sensor and receiver system employed to implement such control and guidance (see, for example, FIGS. 14B and 14C).

Figure 18A:
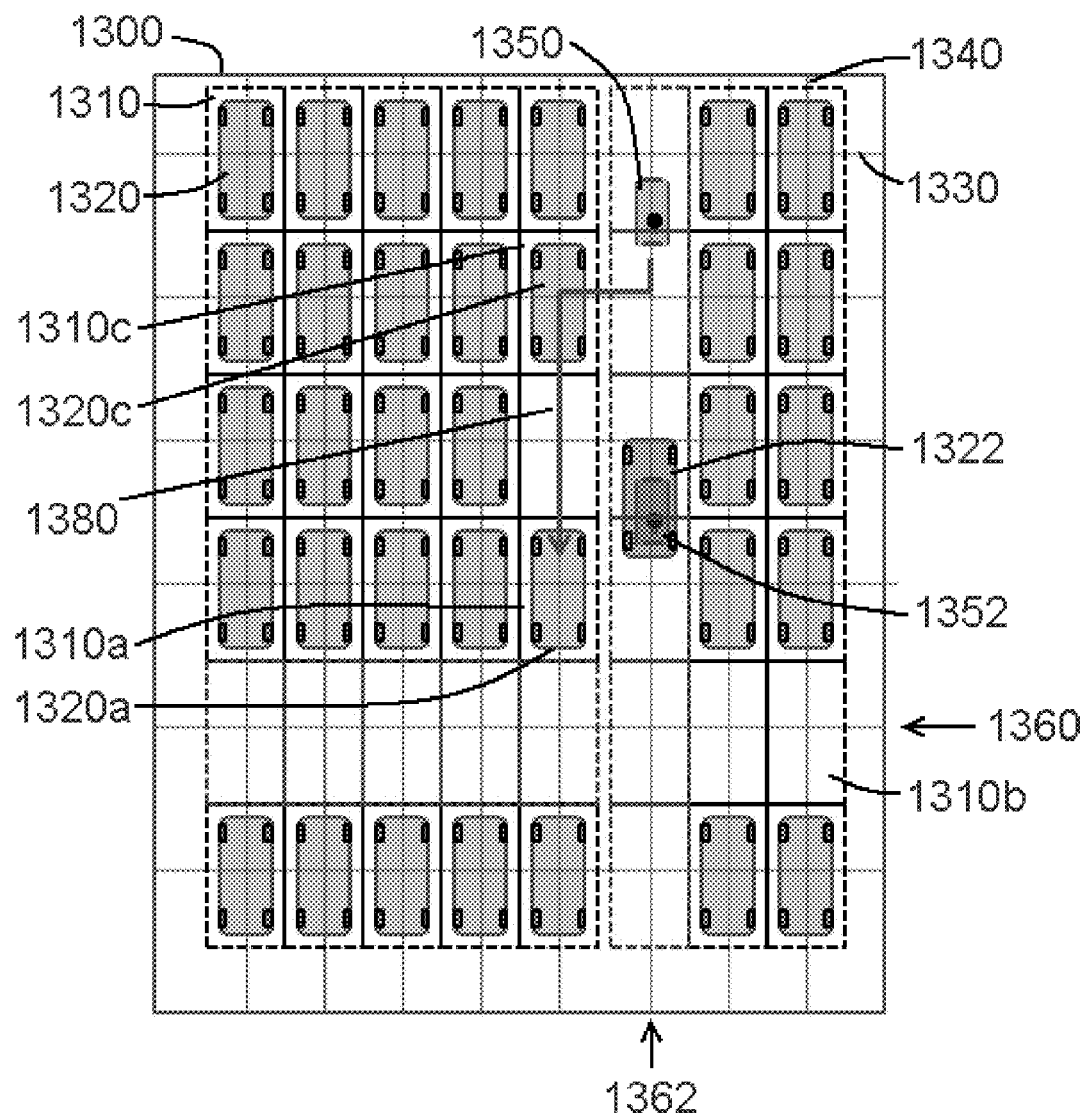
FIGS. 18A-18C illustrate one embodiment of a control method and use of an AGV to re-route a travel path around an obstruction.
Figure 18B:
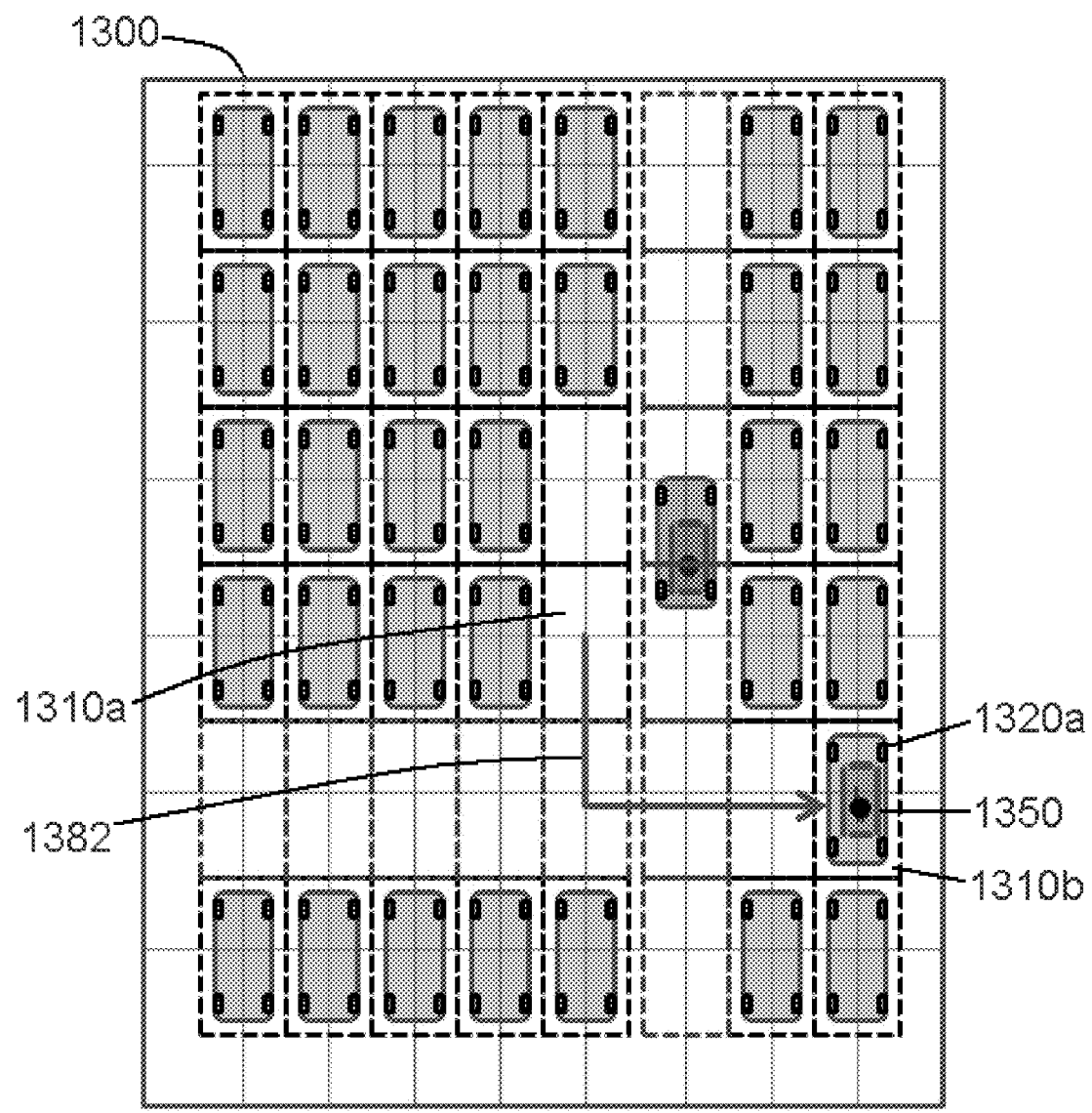
Figure 18C:
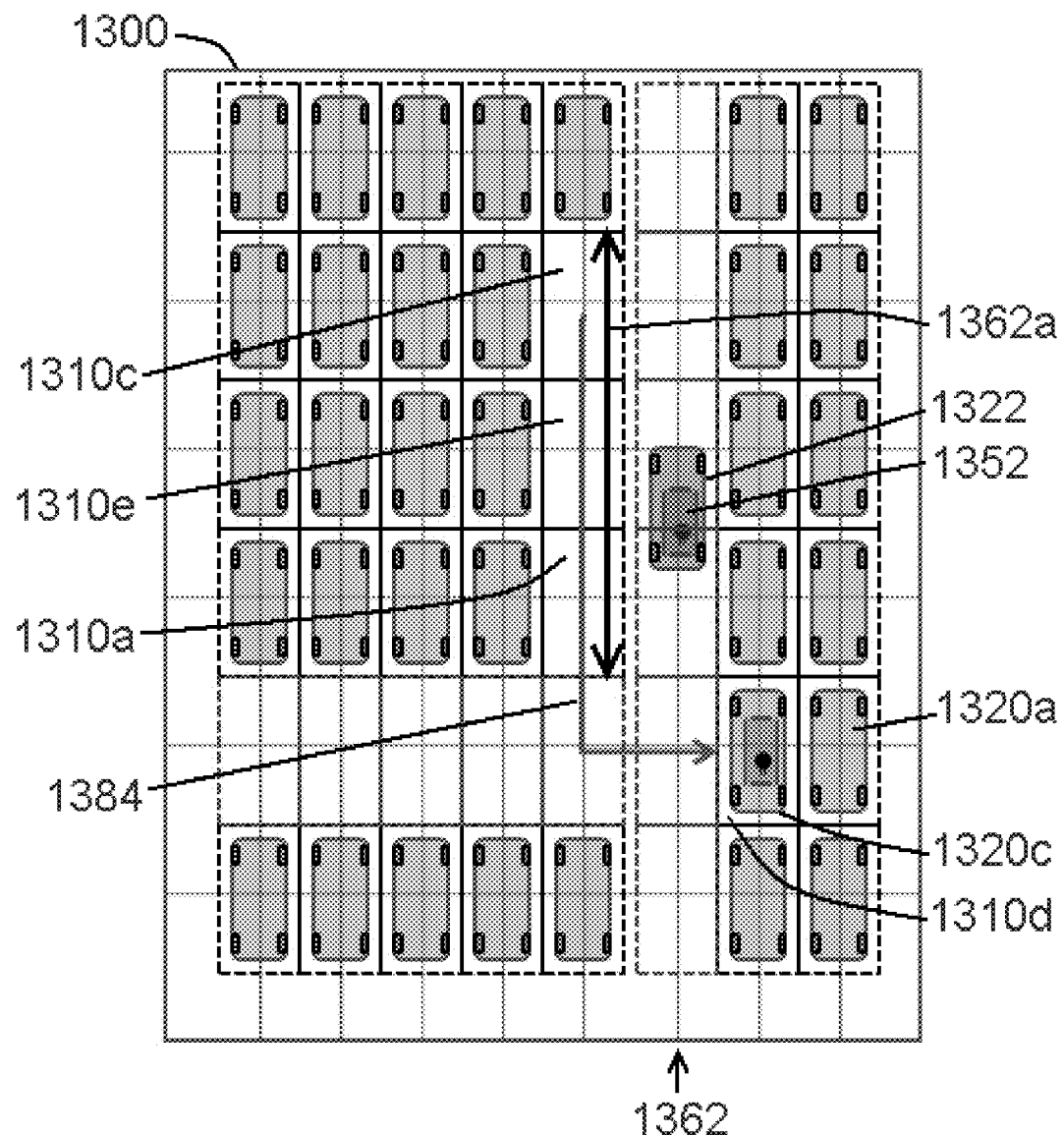

FIGS. 18A-18C illustrate one example of a facility 1300 that comprises a plurality of storage locations 1310 occupied by a plurality of vehicles 1320, X and Y guidance wires 1330 and 1340 respectively, AGVs 1350 and 1352 and a plurality of travel lanes 1360 and 1362 following X-axis and Y-axis guide wires respectively and having temporary overflow locations. In the embodiment of FIGS. 18A-18C, there is a problem with AGV 1352 carrying vehicle 1322 such that it creates an impassable obstruction along travel lane 1362. FIGS. 18A-18C illustrate one method of dynamically re-routing travel lane 1362 to create a new travel lane 1362a (FIG. 18C). First, in a non-limiting method, it is desired for AGV 1350 to deliver vehicle 1320a from storage location 1310a to storage location 1310b, whereby AGV 1350 follows path 1380 (FIG. 18A) by scooting under stored vehicle 1320c until it reaches and acquires target vehicle 1320a, and then delivers vehicle 1320a along path 1382 (FIG. 18B) to target location 1310b. Then, as shown in FIG. 18C, vehicle 1320c is delivered from storage location 1310c to storage location 1310d along path 1384, which frees up storage locations 1310a, 1310c and 1310e to form the new travel lane 1362a. This new temporary travel lane 1362a is thus established dynamically by the control system (not shown) for Y axis movement within the system to route around the temporary obstruction 1352 and 1322 until the problem causing it can be corrected through remote or onsite remedial intervention. Additional vehicles shown above and below the arrow points defining the travel lane 1362a could also be moved into temporary or overflow storage locations one space to the right of their current location in order to extend the "Y" axis Travel Lane if and as needed.

Figure 19A:
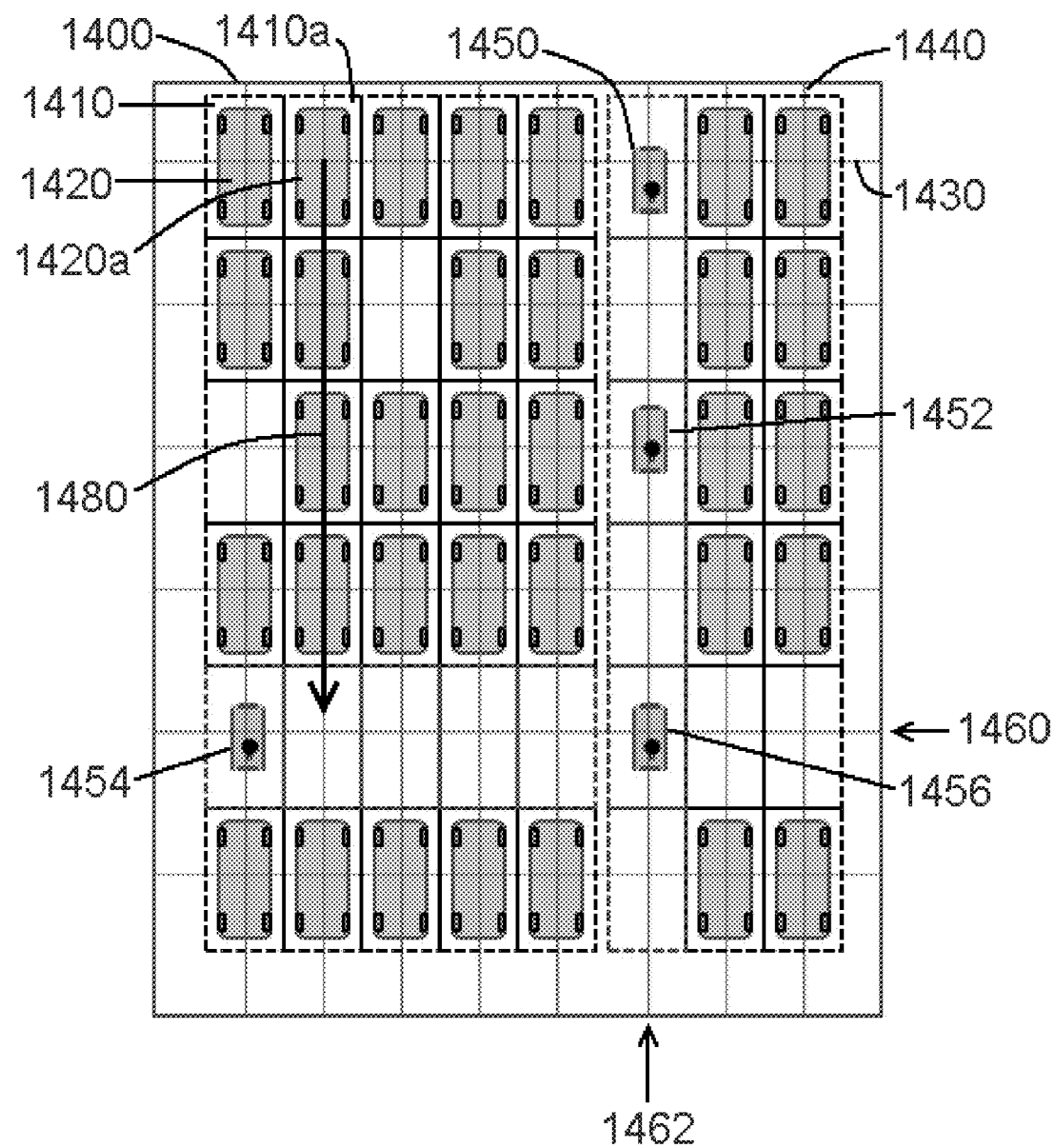
FIGS. 19A-19D illustrate one embodiment of a control method and the use of multiple AGVs to retrieve a load from a blocked storage location.
Figure 19B:
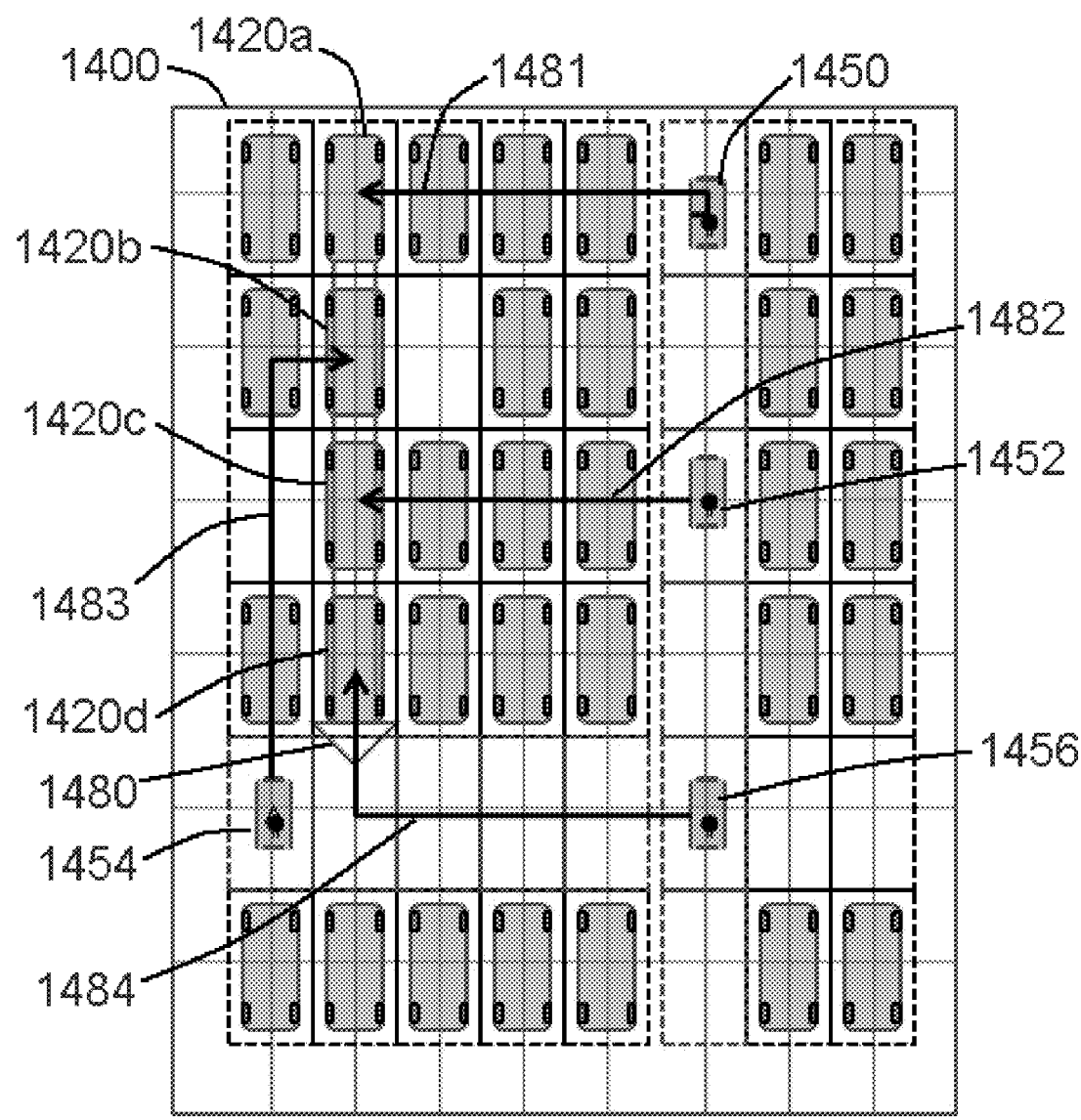
Figure 19C:
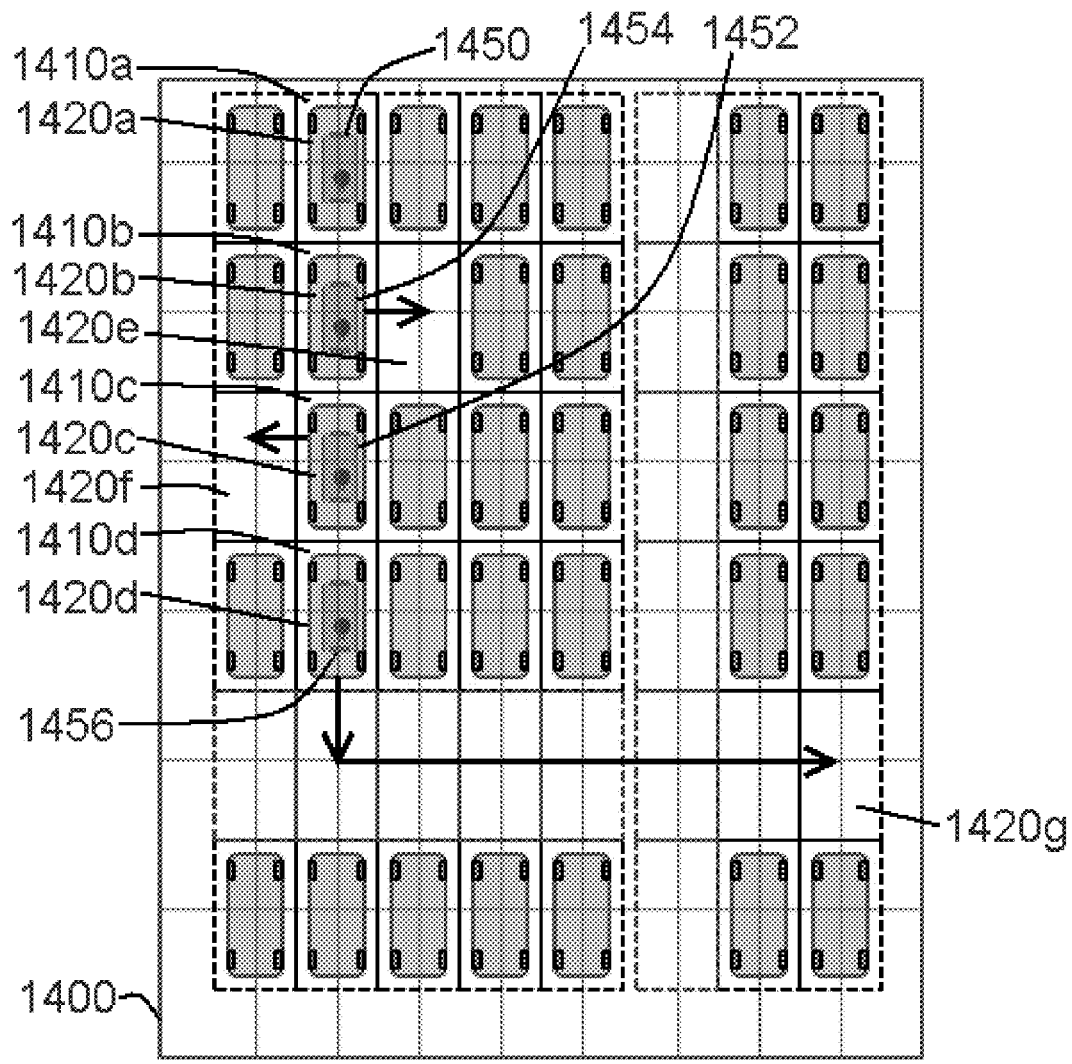
Figure 19D:
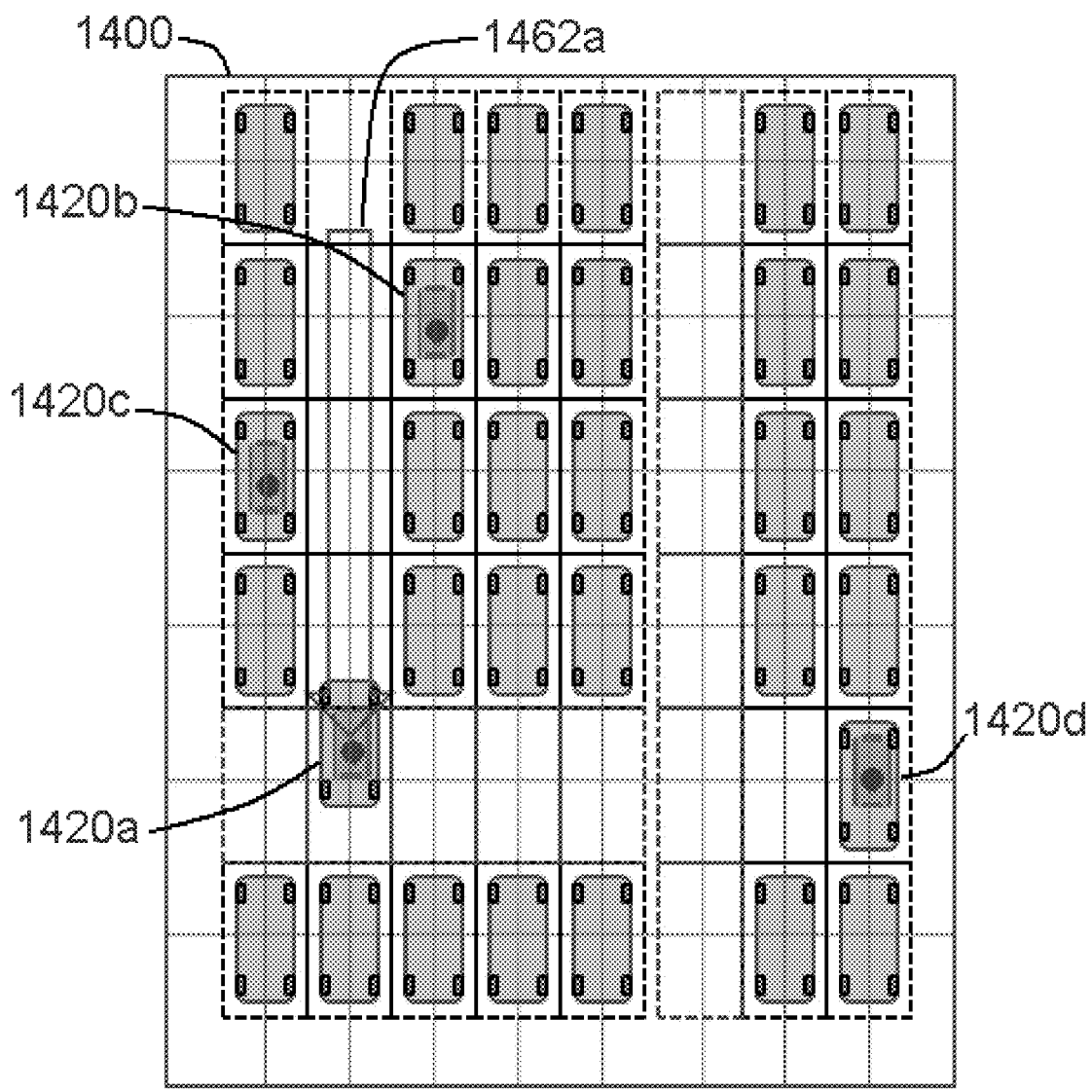

FIGS. 19A-19D demonstrate the ability to dynamically coordinate multiple AGVs to retrieve a target load isolated from travel lanes with improved AVG guidance and control system using variable offset positioning antennas. Specifically, FIGS. 19A-19D illustrate one example of a facility 1400 that comprises a plurality of storage locations 1410 occupied by a plurality of vehicles 1420, X and Y guidance wires 1430 and 1440 respectively, AGVs 1450, 1452, 1454 and 1456 and a plurality of travel lanes 1460 and 1462 following X-axis and Y-axis guide wires respectively and having temporary overflow locations. FIG. 19A illustrates the AGVs in standby positions awaiting commands from the control system (not shown). When it is determined that vehicle 1420*a* needs to be retrieved from storage location 1410*a*, an optimal retrieval route 1480 for vehicle 1420*a* is determined and plotted by the control system. As shown in FIGS. 19B and 19C, AGVs 1450, 1452, 1454 and 1456 are directed to follow paths 1481, 1482, 1483 and 1484 respectively in order to acquire vehicles 1420*a*, 1420*b*, 1420*c* and 1420*d* respectively in storage locations 1410*a*, 1410*b*, 1410*c* and 1410*d* respectively. As shown in FIG. 19D, AGV 1452 moves vehicle 1420*b* to empty storage location 1420*e*, AGV 1454 moves vehicle 1420*c* to empty storage location 1420*f*, and AGV 1456 moves vehicle 1420*d* to empty storage location 1420*g*, whereby a new travel lane 1462*a* is formed for the retrieval of vehicle 1420*a*.

FIGS. 21-25 illustrate non-limiting embodiments of an alternately-constructed AGV 1600 designed to move either automobiles parked on vehicle trays 1700 or storage lockers 1800 from loading areas (not shown) to storage areas (not shown) and then retrieve them on demand. The system of the present invention is, in one respect, an evolution of the automated storage system of U.S. application Ser. No. 12/032,671, filed Feb. 16, 2008, the contents of which are incorporated herein by reference, although the present system incorporates a controllable and guidable AGV whereas the '671 application system does not. Unlike the previous embodiments described in the present application, the AGV 1600 comprises a rigid framed rectangular body 1610 that does not expand or contract as described, for example, in U.S. Application 61/145,543, filed Jan. 17, 2009, incorporated herein by reference. The AGV 1600 drives under a vehicle tray 1700 or storage locker 1800 to be acquired which in one of many possible embodiments is sitting up on four legs 1710 or 1810, and then lifts the vehicle tray 1700 or storage locker 1800 at preferably four contact points 1620 by use of a hydraulic pump motor and hydraulic lifters 1630. Instead of the target vehicles or loads (not shown) being parked on a concrete floor in a loading area as shown, for example, in FIG. 13 herein, the vehicles pull onto the vehicle trays 1700 that are suitably supported by and provided in the loading areas. The vehicle trays 1700 are preferably elevated relative to the remainder of the system travel area so that the AGV 1600 does not need to change elevation between the loading area and the storage area, which is not a concern in the previous embodiments where the AGV scoots under the vehicle body for acquisition thereof.

Figure 21:
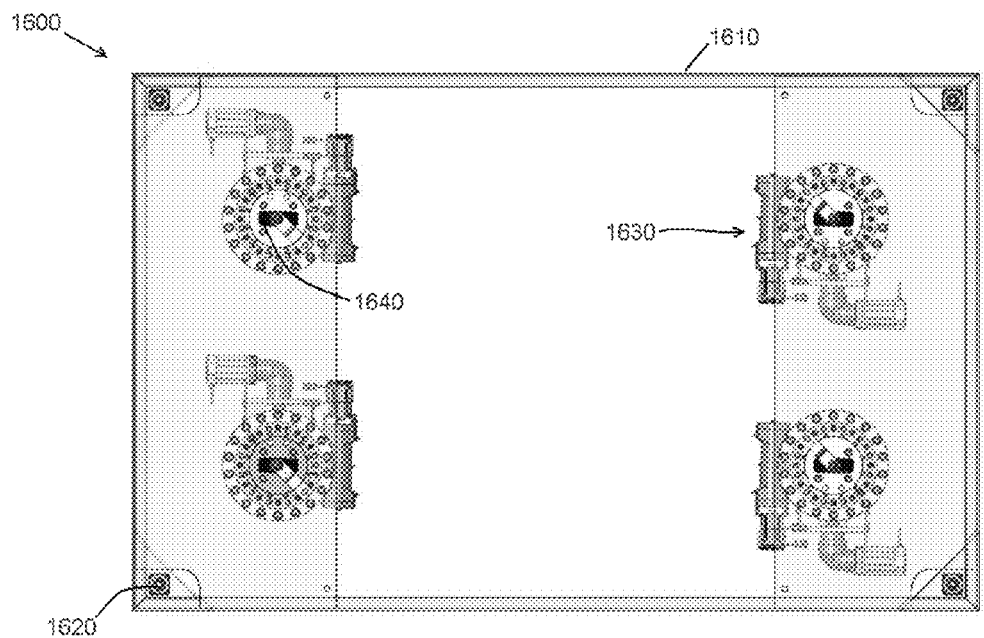
FIG. 21 is a top view of an alternative embodiment of an AGV in accordance with the present invention.
Figure 22:
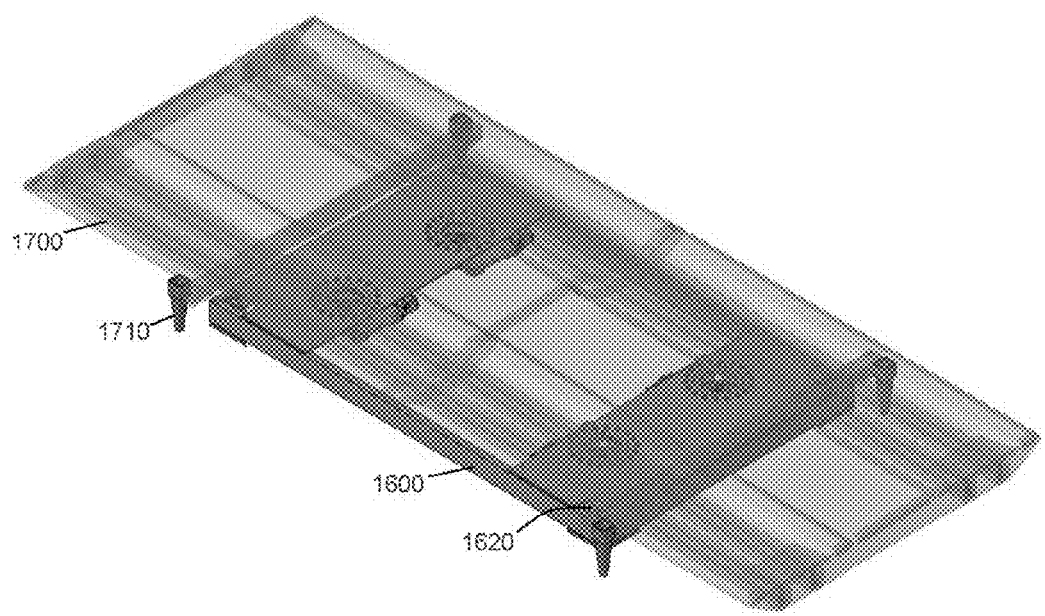
FIG. 22 illustrates one embodiment of the AGV of the invention carrying a vehicle tray.
Figure 23:
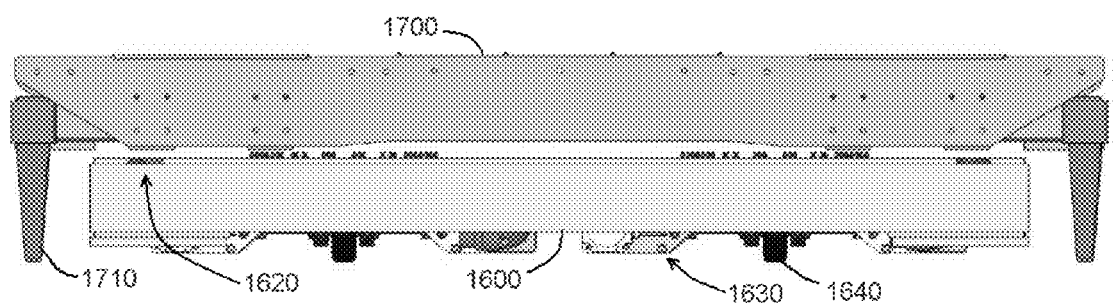
FIG. 23 is one embodiment of an edge view of FIG. 22.
Figure 24:
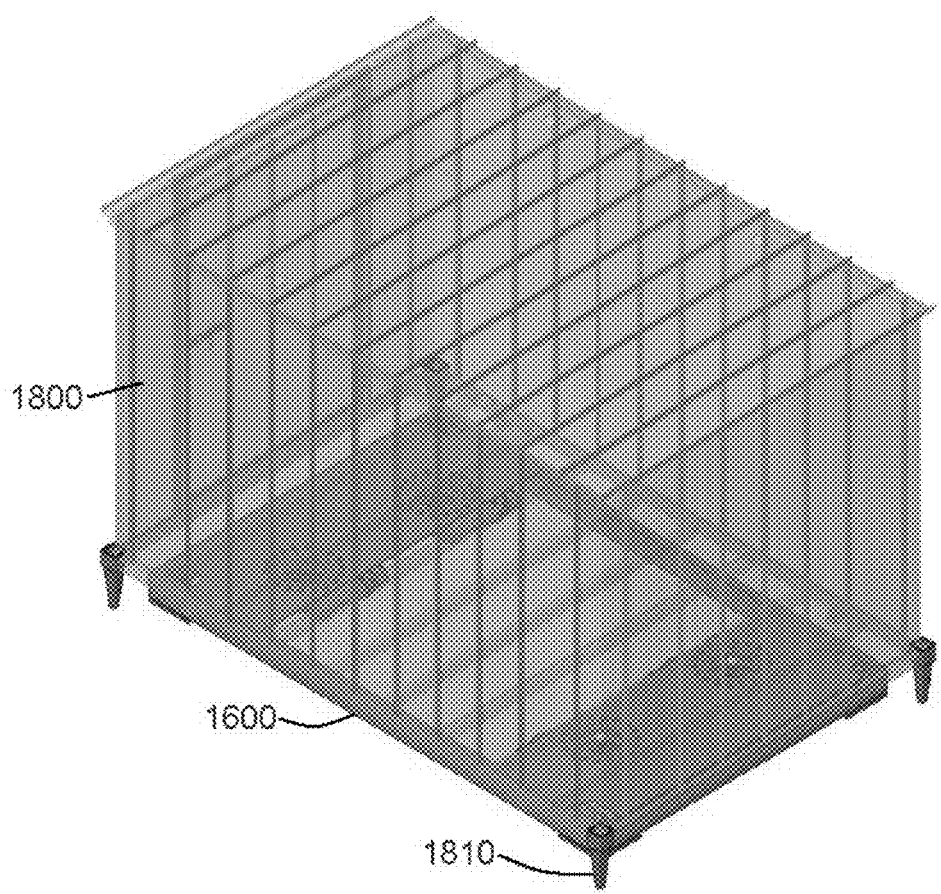
FIG. 24 illustrates one embodiment of an AGV of the invention carrying a storage locker.
Figure 25:
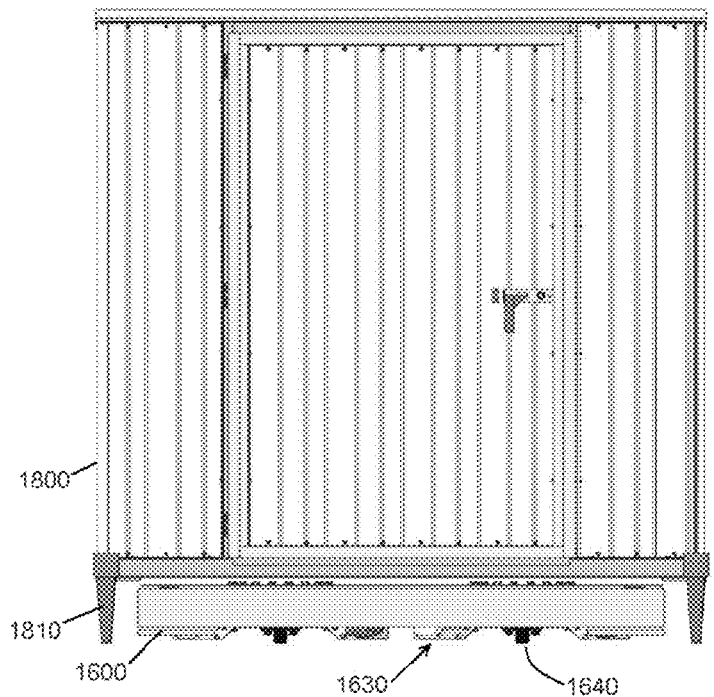
FIG. 25 is one embodiment of an edge view of FIG. 24.

Once the vehicles (or other loads) are on the trays 1700, they are treated similar in all aspects to vehicles handled in previously described embodiments, where the vehicle-laden tray becomes the load that is delivered by the AGV 1600 from the loading area to the storage area. The vehicle-laden tray is preferably initially scanned by the control system to determine the exact dimensions of the tray with vehicle, after which an AGV 1600 is dispatched to acquire them whereby they are then picked up and transported from the loading area, through retrieval lanes at offsets as appropriate, up or down vertical conveyors as needed, until they are delivered to a storage location. In the embodiment of FIGS. 21-23, the load or the vehicle always remains on top of the tray 1700 as it is moved through the system rather than being lifted by its tires and then deposited in a storage location. Just as in previously-described embodiments, the AGV 1600 travels across standard floors and follows a wire guidance grid that is optimized by the implementation of an enhanced AGV antenna array provided on the AGV 1600 as described previously and with actions coordinated by a traffic master server system. The AGV 1600 of the current embodiment uses an omni-directional drive and steering system that is preferably larger and based upon a slewing gear rather than that shown in U.S. Application 61/248,448, filed Oct. 3, 2009, the contents of which are incorporated herein by reference, in order to accommodate larger loads necessitated through the transport of storage containers 1800 or the like. In all other aspects, however, the overall system is substantially similar to the previously described systems, though not quite as efficient in use of space due to the use of vehicle trays and the height of the trays on legs, but still having the advantage of being able to store cars of different lengths in different length spaces and being able to shift vehicles sideways and perform coordinated retrievals just like the previously-described AGV systems. The system using the AGV 1600 has an advantage of being able to handle higher maximum load weights, so that large vehicles or self-storage lockers 1800 are easily handled by it. Similar to the previously-described AGV systems, the AGV 1600 is preferably battery powered with in-floor charging stations, uses wireless communications, and has four drive wheels 1640.

Figure 26:
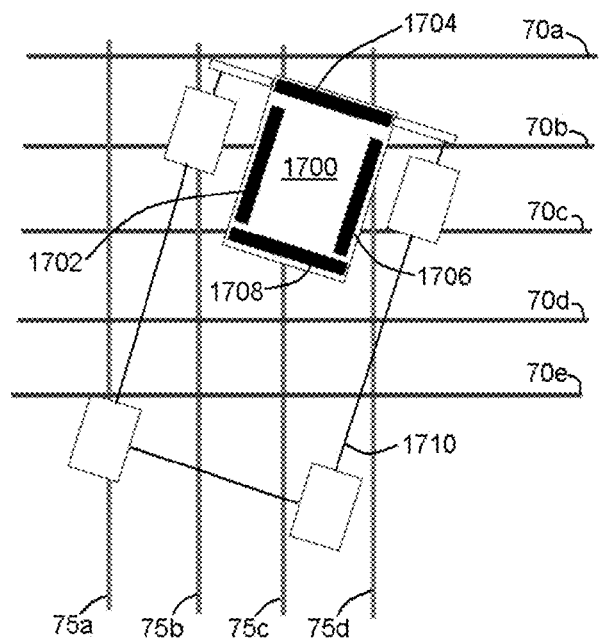
FIG. 26 illustrates an alternative embodiment of an AGV of the invention traveling along a diagonal path.

FIG. 26 illustrates yet another embodiment of an AGV 1700 carrying a load 1710 such as a vehicle and having antenna arrays 1702, 1704, 1706, 1708 that demonstrates a "skewed crabbing" technique. In FIGS. 7 through 8B, for example, and the majority of the other figures described herein, the travel path is generally dictated by a control system that instructs the AGV to follow horizontal or vertical paths along an X-Y grid pattern with dynamic offsets as required to meet obstacles or other environmental conditions. FIG. 26 illustrates a diagonal travel path within an X-Y wire grid framework defined by X-axis guide wires 70*a*-70*e* and Y-axis guide wires 75*a*-75*d*, where the AGV 1700 is positioned such that the antennas are simultaneously positioned over multiple X-axis and Y-axis guide wires. Such a positioning of the AGV 1700 would be useful for acquiring loads whose center axes are not just offset from the guide wires, but also whose axes are not parallel to them, and for packing non-rectangular loads more economically. Control and guidance of the AGV 1700 is performed by a skewing command from the traffic master control system to the AGV 1700, which adds a skew angle as an offset to the current heading to position the front and rear antenna readings to correspond to the commanded skew angle from the traffic master control system.

In FIG. 26, each antenna array is preferably constructed to distinguish between multiple guide wires at the same time. For example, antenna 1706 spans between guide wires 70*b*, 75*d* and 70*c*, while antenna 1708 spans between guide wires 70*c* and 75*c*. In the embodiment of FIG. 14A, for example, the X-axis guide wires 920 are energized with a certain X-axis frequency 925, while the Y-axis guide wires 930 are energized with a certain Y-axis frequency 935. In the embodiment of FIG. 26, the AGV antenna arrays can distinguish between multiple X-axis guide wires 70 of the same frequency and multiple Y-axis guide wires 75 of the same frequency as long as the respective guide wires are separated by a sufficient distance and as long as the antenna inductor coils are sufficiently arranged and controlled by the master control system to distinguish between the respective guide wires relative to the overall position of the AGV relative to the guide wire layout. In an alternative embodiment, each X-axis guide wire and each Y-axis guide wire could be provided with a distinct frequency that is sensed by the inductor coils in the antenna arrays so that positioning of the AGV 1700 relative to the guide wire layout can be focused to a specific inductor coil on a specific antenna array relative to a specific guide wire within the guide wire layout. Such a system may be preferred depending on the spacing of the guide wires so it is not necessary to discriminate between multiple guide wires of the same frequency solely through the spacing of such wires relative to the AGV. In other words, with multiple distinct frequencies, the traffic master control system can dynamically and angularly skew and offset the positioning of the AGV 1700 through the simultaneous processing of multiple frequencies across multiple antenna arrays and by targeting select guidance and positioning sensors within the antenna arrays.

While the present invention has been described at some length and with some particularity with respect to the several described embodiments, it is not intended that it should be limited to any such particulars or embodiments or any particular embodiment, but it is to be construed with reference to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

We claim:

1. A variable offset positioning antenna array for an automated guided vehicle (AGV) that is adapted to follow a guide wire having a frequency, comprising:
    a) two or more inductor coils that each generate an output based on a strength of the frequency sensed at each coil; and
    b) a programmable microprocessor that processes the output from each coil to determine a position of the antenna array relative to the guide wire and uses the determined position to control an offset relative to the guide wire in a path followed by the AGV equipped with the antenna array;
    c) wherein the offset relative to the guide wire is dynamically adjusted.

2. The antenna array of claim 1, further adapted to simultaneously follow multiple guide wires having the same or differing frequencies to determine data regarding direction of travel, speed, position, or orientation of the AGV incorporating the antenna array.

3. The antenna array of claim 1, further comprising a front antenna array and a rear antenna array incorporated into the AGV and controlled by a control system to simultaneously provide guidance information to an AGV guidance and control system for steering and guidance of the AGV.

4. The antenna array of claim 1, further comprising use of one or more additional pairs of antenna arrays on the AGV to determine a location of the AGV relative to a multiple-axis guide wire grid.

5. The antenna array of claim 1, wherein the microprocessor determines a position of the AGV relative to the guide wire in an off-wire situation.

6. The antenna array of claim 1, further comprising a control system for enabling the AGV to carry a load in multiple offset positions relative to the guide wire and the direction of travel.

7. The antenna array of claim 1, wherein the guide wire is either a RF wire or magnetic strip.

8. The antenna array of claim 1, wherein the output from the inductor coils comprises:
    a) determining two largest output signals out of all of the output signals;
    b) determining indexes of two inductor coils that output the two largest output signals;
    c) determining if the two inductor coils that output the two largest output signals are adjacent; and
    d) computing a position value using an offset value, a relative position value between the two inductor coils, and a coil separation distance.

9. The antenna array of claim 8, wherein computing the position value further comprises:
    a) determining a maximum signal out of the two largest output signals;
    b) if the index of an inductor coil that outputs the maximum signal is bigger than the index of an indicator coil that outputs the other largest output signal, the position value is computed as follows: position value=offset−d/2+RelPos; otherwise the position value is computed as follows: position value=offset+d/2+RelPos, wherein d is the coil separation distance, and RelPos is the relative position value between the two inductor coils.

10. The antenna array of claim 9, wherein the offset value is computed by multiplying the coil separation distance by a CoilPair parameter, wherein the CoilPair parameter is set to be a minimum value of the indexes of the two indicator coils.

11. The antenna array of claim 10, wherein the relative position value is computed by multiplying the coil separation distance by a SignalPercentage value, wherein the SignalPercentage value is a ratio between the maximum output signal and a sum of the two largest output signals.

* * * * *